United States Patent
Ganapathiappan et al.

(10) Patent No.: US 8,202,358 B2
(45) Date of Patent: Jun. 19, 2012

(54) PHTHALOCYANINE, NAPHTHALOCYANINE, AND BRIDGED PHTHALOCYANINE/NAPHTHALOCYANINE DYES AND INKS CONTAINING THE SAME

(75) Inventors: Sivapackia Ganapathiappan, Los Altos, CA (US); Jayprakash C. Bhatt, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 386 days.

(21) Appl. No.: 12/572,490

(22) Filed: Oct. 2, 2009

(65) Prior Publication Data
US 2011/0079716 A1    Apr. 7, 2011

(51) Int. Cl.
*C09D 11/02* (2006.01)
*C09B 47/04* (2006.01)

(52) U.S. Cl. ............... 106/31.49; 540/128; 540/129; 540/132; 540/139; 540/140

(58) Field of Classification Search ........... 106/31.49; 540/128, 129, 132, 139, 140; 250/338.1
See application file for complete search history.

(56) References Cited

U.S. PATENT DOCUMENTS

| | | | |
|---|---|---|---|
| 5,618,929 A * | 4/1997 | Harrison et al. | 540/139 |
| 5,709,717 A | 1/1998 | Reddig et al. | |
| 5,780,621 A | 7/1998 | Harms et al. | |
| 6,498,249 B1 | 12/2002 | Snow et al. | |
| 7,005,518 B2 | 2/2006 | Peng et al. | |
| 7,097,701 B2 * | 8/2006 | Tateishi et al. | 106/31.49 |
| 7,449,058 B2 | 11/2008 | Patel | |
| 7,524,367 B2 * | 4/2009 | Ihm et al. | 106/31.49 |
| 7,550,038 B2 * | 6/2009 | Kim et al. | 106/31.49 |
| 7,981,208 B2 * | 7/2011 | Kim et al. | 106/31.49 |
| 2003/0092907 A1 | 5/2003 | Snow et al. | |
| 2004/0171827 A1 | 9/2004 | Peng et al. | |
| 2004/0187734 A1 | 9/2004 | Ozawa et al. | |
| 2005/0009802 A1 * | 1/2005 | Roncucci et al. | 540/128 |
| 2005/0039274 A1 | 2/2005 | Yang et al. | |
| 2005/0200803 A1 | 9/2005 | Snow et al. | |
| 2006/0162615 A1 | 7/2006 | Patel | |
| 2006/0201387 A1 | 9/2006 | Patel | |

OTHER PUBLICATIONS

Hewlett-Packard Development Company, Naphthalocyanine Dye and Ink Containing the Same, PCT/US2009/055504, Aug. 31, 2009.

* cited by examiner

*Primary Examiner* — Helene Klemanski

(57) ABSTRACT

Phthalocyanine dyes, naphthalocyanine dyes, and/or bridged phthalocyanine/naphthalocyanine dyes represented by one of the general structures I to XVII, inkjet ink formulation comprising said dyes, and detection systems using said dyes are disclosed and described.

20 Claims, 1 Drawing Sheet

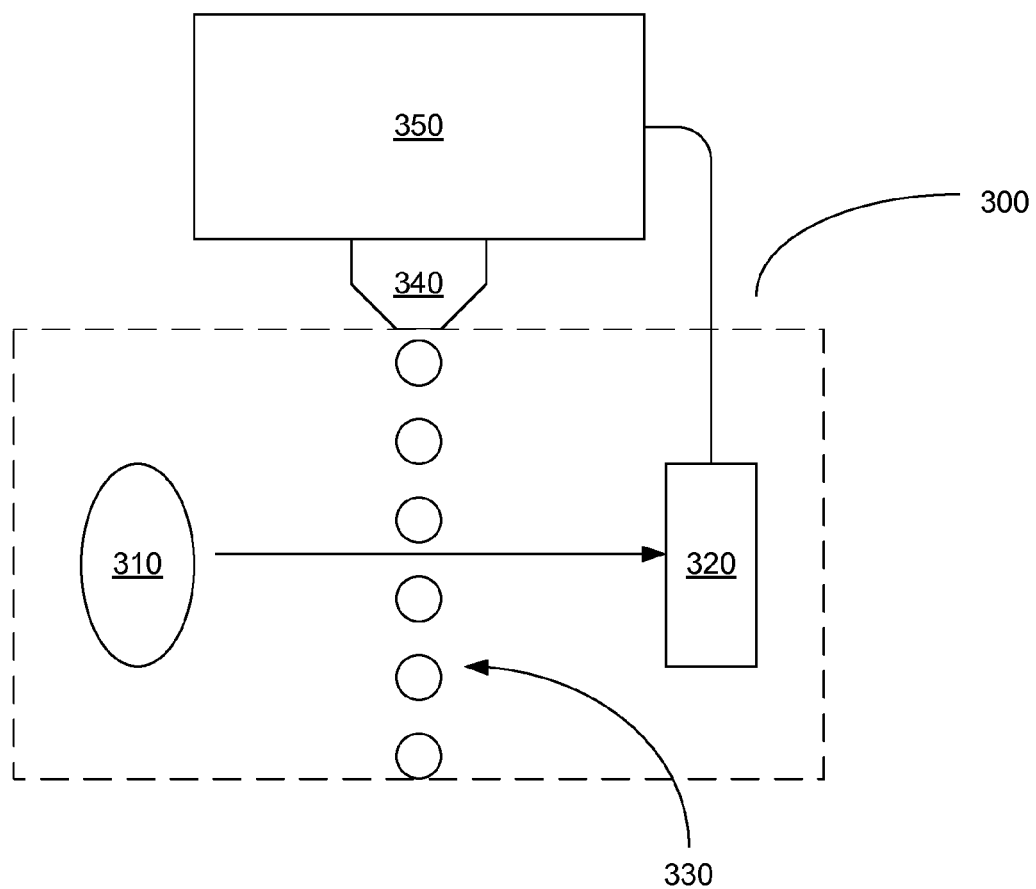

PHTHALOCYANINE, NAPHTHALOCYANINE, AND BRIDGED PHTHALOCYANINE/NAPHTHALOCYANINE DYES AND INKS CONTAINING THE SAME

BACKGROUND

Phthalocyanines and naphthalocyanines are macrocylic compounds that have strong coloring power attributed to their alternating nitrogen and carbon atom central ring structures of porphyrin compounds (i.e., benzene-porphyrin and naphthalene-porphyrin compounds, respectively). As such, phthalocyanines and naphthalocyanines are useful in coloring agents with many applications in biology and chemistry as well as industry. The central nitrogen atoms of a pyrroline portion of the porphyrin compounds may be either complexed with a metal or are metal-free to provide further variations in color. For example, metal-free phthalocyanine has a blue-green color while copper-complexed phthalocyanine has a blue color (Pigment Blue 15). Other substitutions on the phthalocyanine and naphthalocyanine compounds invoke other colors as well. In general, these dyes exhibit absorption at wavelengths up to 1000 nm. Phthalocyanine and naphthalocyanine are chemically stable compounds that are normally not soluble in water or aqueous solutions. Water soluble groups can be added to increase the water solubility of the phthalocyanine and naphthalocyanine compounds. To solubilize either of their structures, one or both of highly ionic groups and soluble ethylene oxide groups can be attached to dissolve them in water. Unfortunately, commercial water soluble cyanine, phthalocyanine and naphthalocyanine compounds with near IR absorption have relatively poor stability in water or aqueous solution or do not have the appropriate absorption range. Any degradation in solution that changes their physical or chemical nature can destroy their conjugation, such that their characteristic absorption (color) may be lost.

BRIEF DESCRIPTION OF THE DRAWINGS

In order to better understand the present invention, some embodiments will be described below by way of non-limiting examples only, with reference to figures, wherein:

FIG. 1 illustrates a block diagram of a detection system for an inkjet printer, according to an embodiment of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this disclosure is not limited to the particular process steps and materials disclosed herein because such process steps and materials may vary somewhat. It is also to be understood that the terminology used herein is used for the purpose of describing particular embodiments only. The terms are not intended to be limiting because the scope of the present disclosure is intended to be limited only by the appended claims and equivalents thereof.

It must be noted that, as used in this specification and the appended claims, the singular forms "a," "an," and "the" include plural referents unless the context clearly dictates otherwise.

As used herein, "substituted" means that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, amino, alkylamino, thioalkyl, thioalkenyl, thioalkynyl, and thioaryl.

As used herein, "heteroatom" refers to nitrogen, oxygen, phosphorus, or sulfur. The terms "halo" and "halogen" refer to a fluoro, chloro, bromo, or iodo substituent. The term "cyclic" refers to having an alicyclic or aromatic ring structure, which may or may not be substituted, and may or may not include one or more heteroatoms. Cyclic structures include monocyclic structures, bicyclic structures, and polycyclic structures. The term "alicyclic" is used to refer to an aliphatic cyclic moiety, as opposed to an aromatic cyclic moiety.

As used herein, the phrase "aromatic ring system" or "aromatic" includes monocyclic rings, bicyclic ring systems, and polycyclic ring systems, in which the monocyclic ring, or at least a portion of the bicyclic ring system or polycyclic ring system, is aromatic (exhibits, e.g., $\pi$-conjugation). The monocyclic rings, bicyclic ring systems, and polycyclic ring systems of the aromatic ring systems may include carbocyclic rings and/or heterocyclic rings. The term "carbocyclic ring" denotes a ring in which each ring atom is carbon. The term "heterocyclic ring" denotes a ring in which at least one ring atom is not carbon and comprises 1 to 4 heteroatoms.

As used herein, "alkyl" refers to a branched, unbranched, or cyclic saturated hydrocarbon group, which typically, although not necessarily, contains from 1 to about 50 carbon atoms, 1 to about 30 carbon atoms, or 1 to about 10 carbon atoms, for example. Alkyls include, but are not limited to, methyl, ethyl, n-propyl, isopropyl, n-butyl, isobutyl, t-butyl, octyl, and decyl, for example, as well as cycloalkyl groups such as cyclopentyl, and cyclohexyl, for example. The term "lower alkyl" refers to an alkyl group having from 1 to 6 carbon atoms. The term "higher alkyl" refers to an alkyl group having more than 6 carbon atoms, for example, 7 to about 50 carbon atoms, or 7 to about 30 carbon atoms. As used herein, "substituted alkyl" refers to an alkyl substituted with one or more substituent groups. The term "heteroalkyl" refers to an alkyl in which at least one carbon atom is replaced with a heteroatom. If not otherwise indicated, the term "alkyl" includes unsubstituted alkyl, substituted alkyl, lower alkyl, and heteroalkyl.

As used herein, "aryl" refers to a group containing a single aromatic ring or multiple aromatic rings that are fused together, directly linked, or indirectly linked (such that the different aromatic rings are bound to a common group such as a methylene or ethylene moiety). Aryl groups described herein may contain, but are not limited to, from 5 to about 50 carbon atoms, or 5 to about 40 carbon atoms, or 5 to 30 carbon atoms or more. Aryl groups include, for example, phenyl, naphthyl, anthryl, phenanthryl, biphenyl, diphenylether, diphenylamine, and benzophenone. The term "substituted aryl" refers to an aryl group comprising one or more substituent groups. The term "heteroaryl" refers to an aryl group in which at least one carbon atom is replaced with a heteroatom. If not otherwise indicated, the term "aryl" includes unsubstituted aryl, substituted aryl, and heteroaryl.

As used herein, "phthalocyanine dye" generally refers to a macrocyclic compound having an alternating nitrogen atom-carbon atom ring structure; said structure including phthalocyanine and a metal, either one of which can be further substituted as described herein. For example, structures I to VIII of the present disclosure are phthalocyanine dyes.

As used herein, "naphthalocyanine dye" refers to a derivatized phthalocyanine dye having at least one naphthalene substituent instead of the phenyl substituent in the phthalocyanine structure. For example, structures XI to XVI of the present disclosure are naphthalocyanine dyes.

As used herein, "bridged phthalocyanine/naphthalocyanine dye" refers to at least two dyes linked by a divalent linking group. As such, the term "bridged phthalocyanine/naphthalocyanine dye" can include two phthalocyanine dyes, two naphthalocyanine dyes, or a phthalocyanine dye and a naphthalocyanine dye linked by a divalent linking group. The divalent linking group is covalently bonded to a phenyl ring on the dye; where such a phenyl group can be on the phthalocyanine substituent, naphthalocyanine substituent, or can be some other substituted phenyl substituent on the dye. For example, structures IX, X, and XVII of the present disclosure are bridged phthalocyanine/naphthalocyanine dyes.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

It has been recognized that the use phthalocyanine dyes, naphthalocyanine dyes, and bridged phthalocyanine/naphthalocyanine dyes, as described herein, having mixed substituents can disturb the symmetry of the dyes, increasing the extinction coefficient and thereby providing advantages previously unknown including, but not limited to, increased storage stability, increased solubility, increased disperability, increased jettability, as well as those described herein. In accordance with this, the present disclosure is drawn to compositions, methods, and systems using these phthalocyanine dyes, naphthalocyanine dyes, and bridged phthalocyanine/naphthalocyanine dyes. It is noted that when discussing the present compositions, associated methods, or associated systems, each of these discussions can be considered applicable to each of these embodiments, whether or not they are explicitly discussed in the context of that embodiment. Thus, for example, in discussing a substituent or metal for a phthalocyanine dye, such a substituent or metal can also be used for a naphthalocyanine dye or bridged phthalocyanine/naphthalocyanine dye, and vice versa.

Generally, embodiments of the present disclosure relate to phthalocyanine dyes, naphthalocyanine dyes, and bridged phthalocyanine/naphthalocyanine dyes having extended conjugation with a near-infrared (NIR) absorption greater than 700 nm. In one embodiment, the present disclosure relates to phthalocyanine dyes, naphthalocyanine dyes, and bridged phthalocyanine/naphthalocyanine dyes having absorptions in the range of 700 to 1000 nm; in another embodiment, in the range of 800 to 1000 nm.

In an embodiment of the present disclosure, the phthalocyanine dyes, naphthalocyanine dyes, and bridged phthalocyanine/naphthalocyanine dyes are water soluble, dispersible in aqueous solution, dispersible in aqueous blend solutions and dispersible in solvent soluble compounds. In another embodiment, the phthalocyanine dyes, naphthalocyanine dyes, and bridged phthalocyanine/naphthalocyanine dyes exhibit long term stability in such solutions and dispersions in a wide pH range.

Without being limited by the theory, it is believed that the solubility-dispersibility in various solutions or suspensions is attributed, in part, to water soluble substituent groups on the phthalocyanine or naphthalocyanine components of the dye. Furthermore, it is believed that the presence of multiple different substituent groups, such as alkyl, alkoxy or aryl groups, disturb the symmetry of phthalocyanine dyes, naphthalocyanine dyes, and bridged phthalocyanine/naphthalocyanine dyes and result, therefore, in dyes that do not aggregate in solution. In an embodiment, in order to disturb the symmetry, mixed substituents are incorporated in the phenyl and/or naphthyl rings.

Generally, molecules having symmetrical structure can aggregate easily out of the solution. Thus, in an embodiment, the dyes according to the present disclosure have a non symmetrical structure, resulting in dyes that do not aggregate in solution and that are easily soluble. Moreover, greater respective solubility and dispersibility may increase the extinction coefficient of the phthalocyanine dyes, naphthalocyanine dyes, and bridged phthalocyanine/naphthalocyanine dyes. Thus, in one embodiment, the presence of multiple different substituent groups disturbs the symmetry of the phthalocyanine dyes, naphthalocyanine dyes, and bridged phthalocyanine/naphthalocyanine dyes and can result in an increase of the extinction coefficient.

Generally, the extinction coefficient defines how strongly a chemical species will absorb light at a given wavelength either per mass, per mole or per concentration. As such, an increased extinction coefficient means that a smaller quantity of phthalocyanine dyes, naphthalocyanine dyes, and/or bridged phthalocyanine/naphthalocyanine dyes may be used for a desired application. Therefore, only a minor amount of phthalocyanine dyes, naphthalocyanine dyes, and/or bridged phthalocyanine/naphthalocyanine dyes, as described in the present disclosure, will be needed for the practical applications by comparison with other dyes. Thus, in an embodiment, inks containing such dyes have the benefit of being more stable and do not have any crystallization of these dyes.

In an embodiment, the present disclosure describes water soluble phthalocyanine dyes, water soluble naphthalocyanine dyes, and water soluble bridged phthalocyanine/naphthalocyanine dyes having extended conjugation with mixed substituents so that near-infrared (NIR) absorptions can be from 700 to 1000 nm range. Furthermore, in an embodiment, the present disclosure describes water soluble phthalocyanine dyes, water soluble naphthalocyanine dyes, and water soluble bridged phthalocyanine/naphthalocyanine dyes that exhibit high extinction coefficient. In an embodiment, these dyes are chemically stable in water as well as in aqueous solvent blends at wide pH range and are very well suited for water based inkjet ink applications.

Without being bound by any particular theory, it is believed that the various substituents included in the chemical structures of the NIR-absorbing phthalocyanine dye, naphthalocyanine dye, and bridged phthalocyanine/naphthalocyanine dye embodiments render the dye embodiments soluble or dispersible in either water soluble ink formulations or solvent soluble ink formulations and blends thereof. The NIR-absorbing phthalocyanine dye, naphthalocyanine dye, and bridged phthalocyanine/naphthalocyanine dye embodiments of the present invention find use in many different water-based systems such as coatings & ink.

In one embodiment, a NIR-absorbing phthalocyanine or naphthalocyanine or bridged phthalocyanine/naphthalocyanine dye according to the various embodiments of the present disclosure comprises solubilizing groups including, but not limited to, one or more of sulfonates, carboxylates, sulfates, phosphates, ammonium ions, ethylene oxides, propylene oxides and combinations thereof that facilitate water solubility-dispersibility and stability in solution or suspension, as mentioned above.

In another embodiment, the absorption of the phthalocyanine dyes, naphthalocyanine dyes, and bridged phthalocyanine/naphthalocyanine dyes described herein can be in the near infrared (NIR) range and can range from 700 nm to 1000 nm. In another embodiment, the extended conjugation of the phthalocyanine dyes, naphthalocyanine dyes, and bridged phthalocyanine/naphthalocyanine dyes shifts the absorption to greater than 800 nm.

In another embodiment, the present disclosure refers to a phthalocyanine dyes, naphthalocyanine dyes, and/or bridged phthalocyanine/naphthalocyanine dyes represented by one of the general structures I to XVII illustrated below. In yet another embodiment, the present disclosure refers to a phthalocyanine dye represented by anyone of the following general structures I to VIII. In still another embodiment, the present disclosure refers to a naphthalocyanine dye represented by anyone of the following general structures IX to XIV. In still another embodiment, the present disclosure refers to a bridged phthalocyanine/naphthalocyanine dye represented by anyone of the following general structures XV to XVII. Structures I to XVII are illustrated as follows:

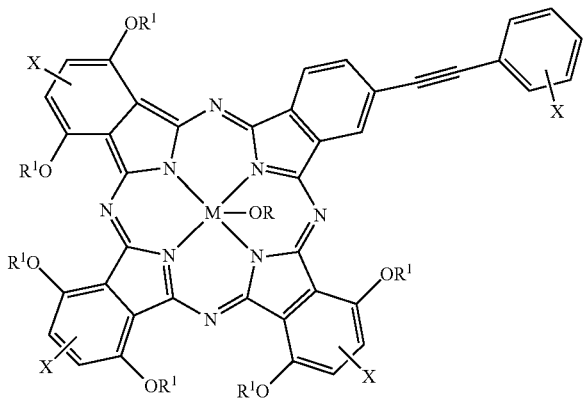

(I)

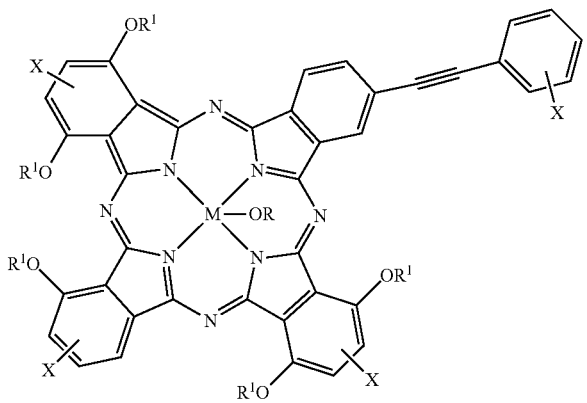

(II)

-continued
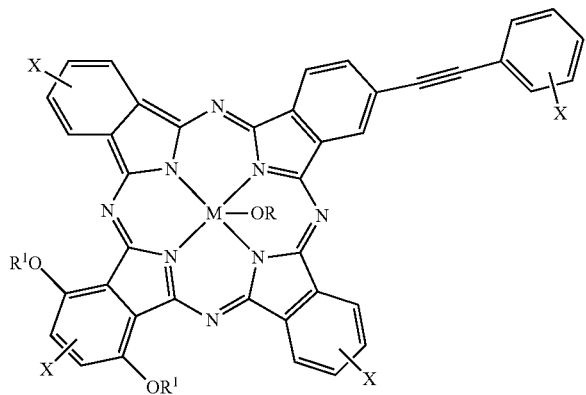
(III)
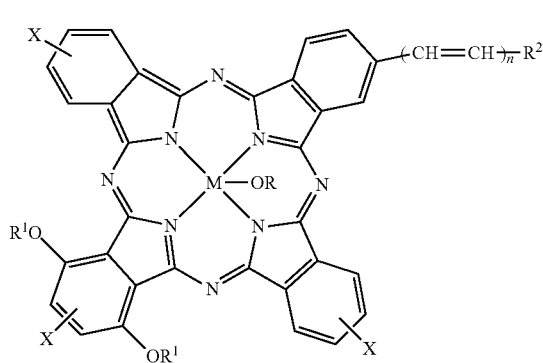
(IV)
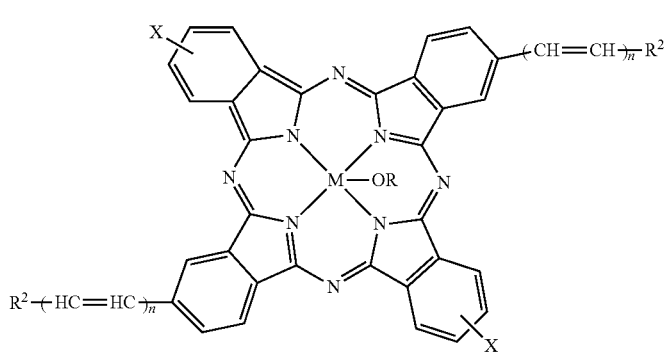
(V)
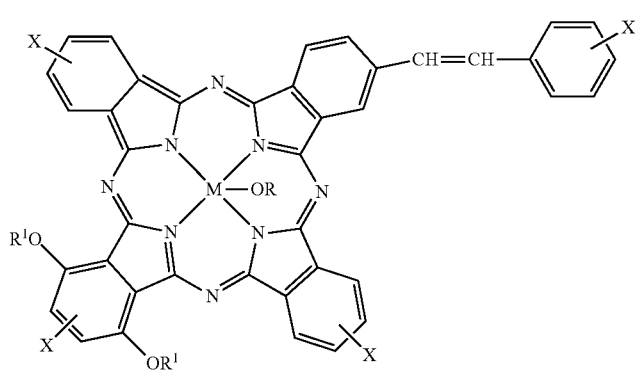
(VI)

(VII)
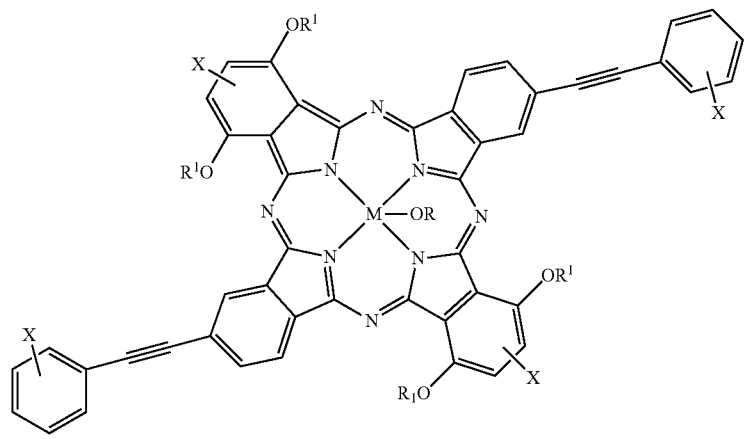
(VIII)
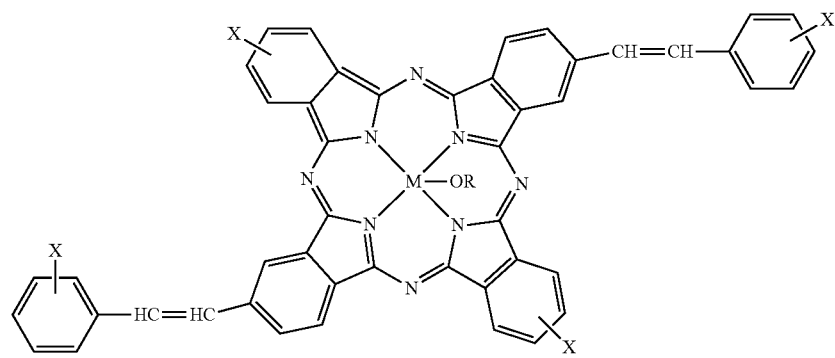
(IX)
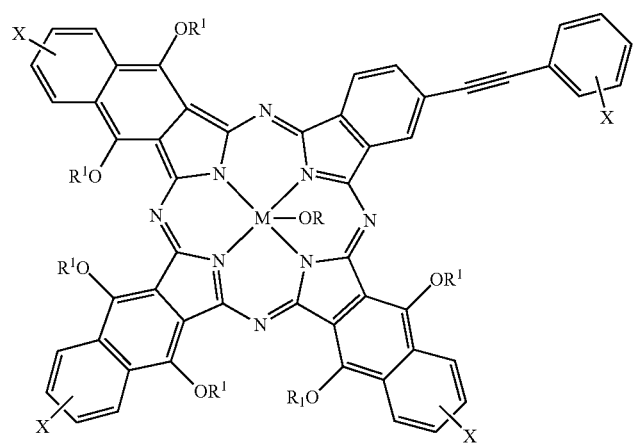

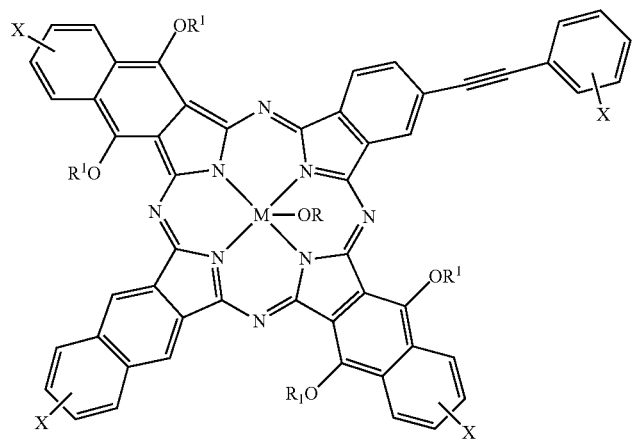
(X)
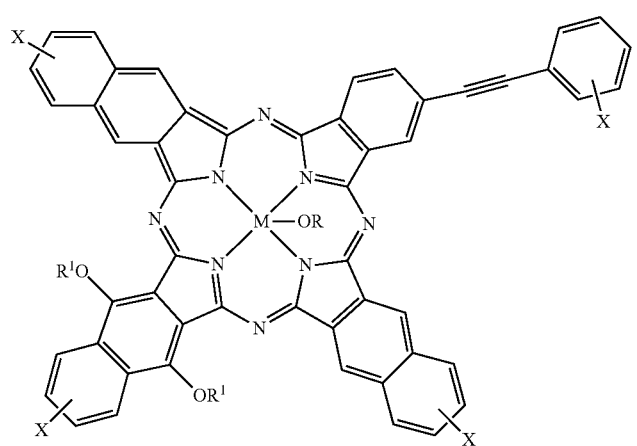
(XI)
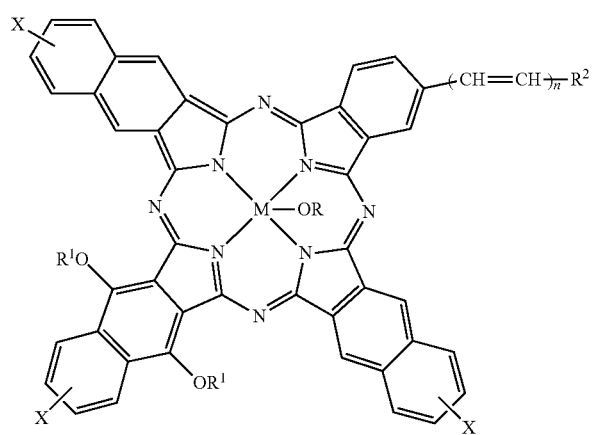
(XII)

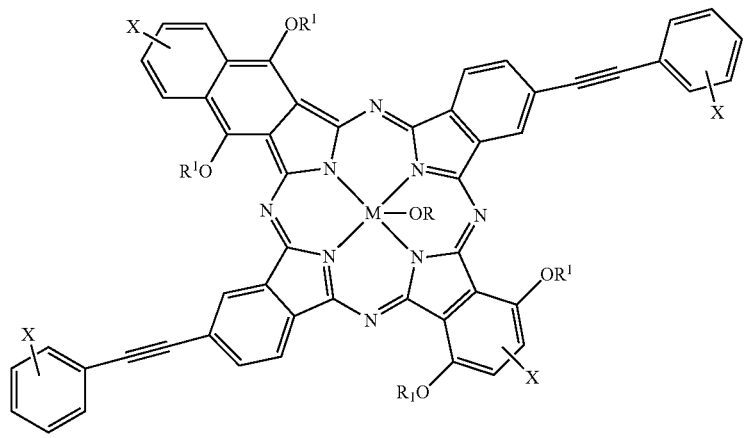
(XIII)
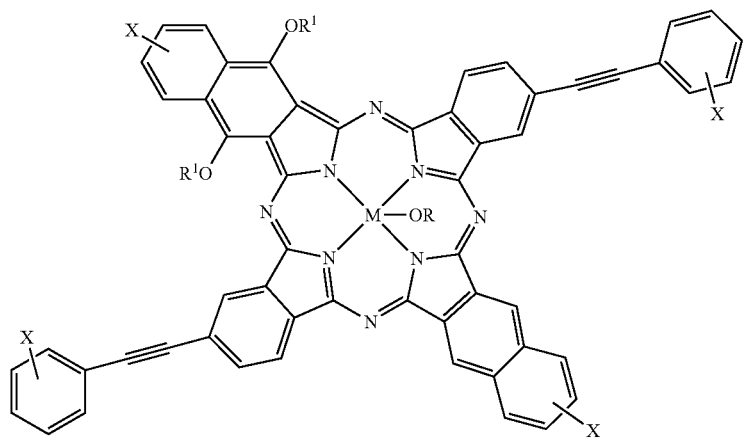
(XIV)
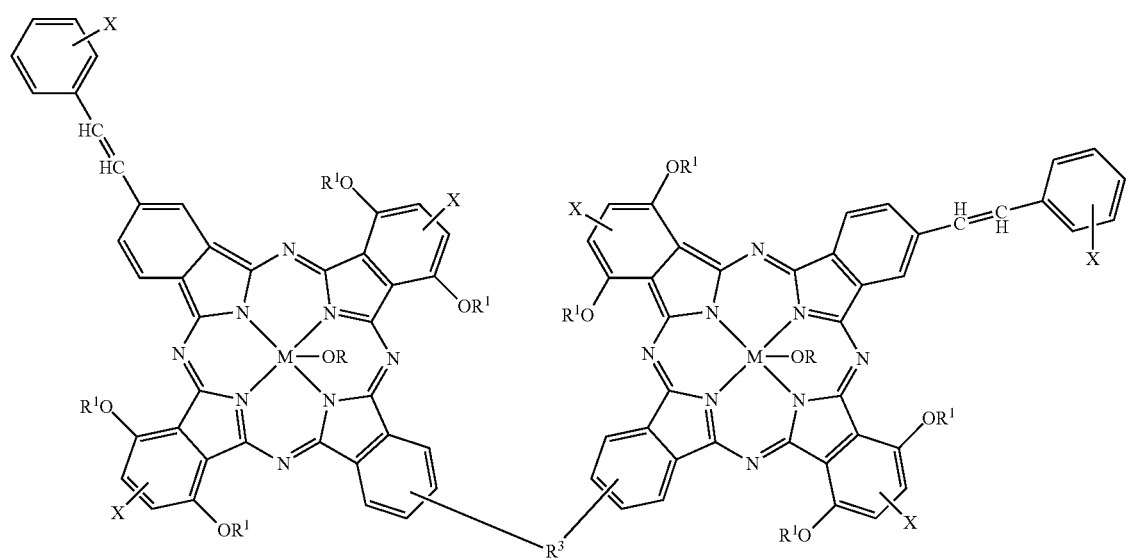
(XV)

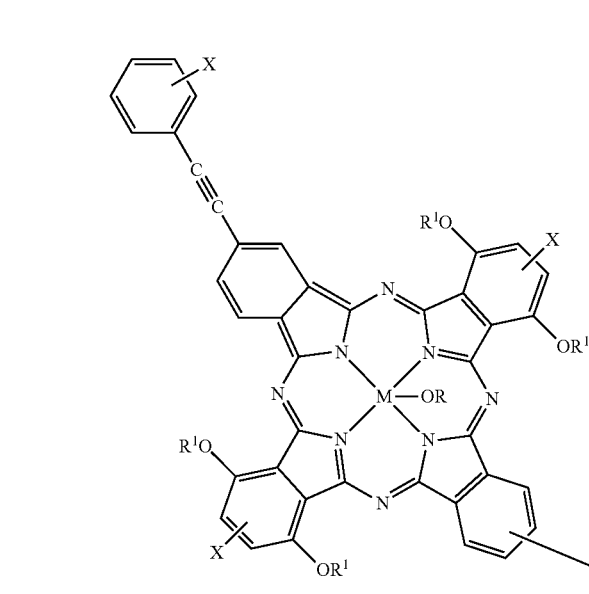
(XVI)

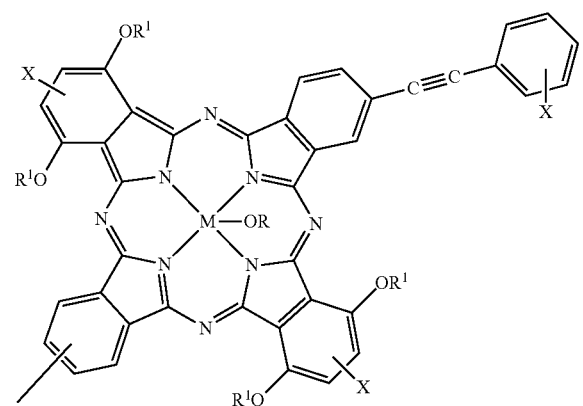

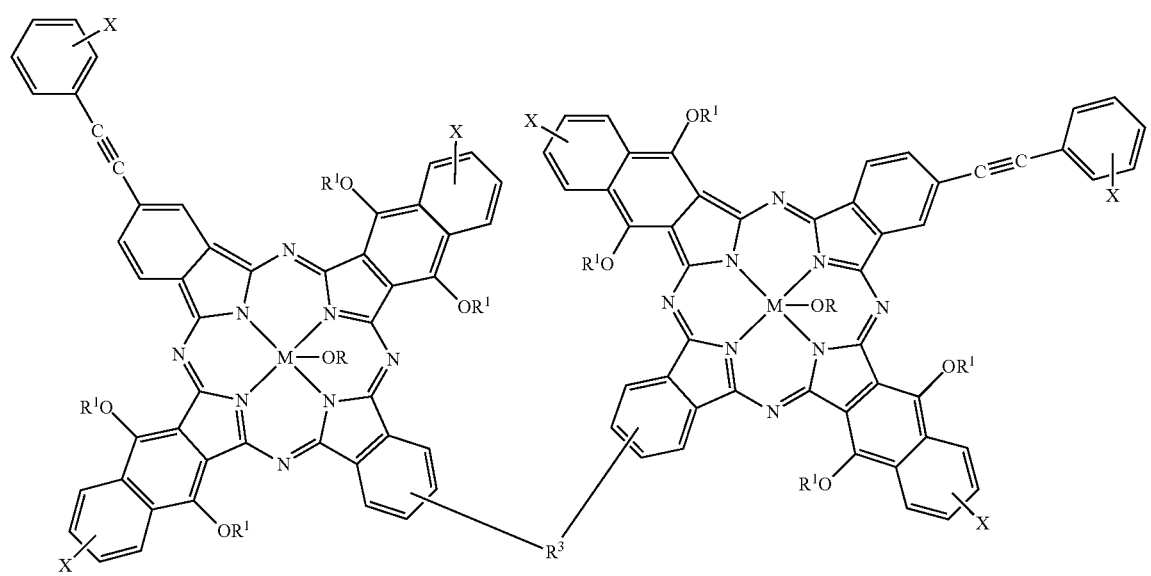
(XVII)

In an embodiment, the present disclosure refers to a phthalocyanine dye represented by anyone of the general structures I to VIII and/or refers to a naphthalocyanine dye represented by anyone of the general structures IX to XIV and/or refers to a bridged phthalocyanine/naphthalocyanine dye represented by anyone of the general structures XV to XVII; wherein, in these general structures I to XVII:

R is H, alkyl substituted alkyl, or $SO_3M^1$;
$M^1$ is H, monovalent cations, or $NR^4_4{}^+$;
OR can be replaced by a halogen;
$R^1$ is H, alkyl, or substituted alkyl or aryl with carbons from 1 to 50;
$R^2$ is H, $CH=CH_2$, or $(-CH=CH-)_n-H$
n is 1 to 5000;
$R^3$ is a divalent linking group;
M is a monovalent, a divalent, a trivalent, a tetravalent or a pentavalent metal ion or transition metal ion;
X is H, alkyl, substituted alkyl, aryl, substituted aryl, $SO_3M^1$, OH, $OCOR^2$; $COOM^1$, $PO_3M^1{}_2$, $NR^4_4{}^+Y^-$, or $O(CH_2CH_2O)_mCH_3$ (m=1 to 500), where at least one of the X in the dye is sulfonate, phosphate or polyethylene glycol, where Y is independently selected from a halide, sulfate, sulfonate, $OH^-$, and $OSO_3{}^-$; and
$R^4$ is H, alkyl, substituted alkyl, aryl, or substituted aryl.

In an embodiment of the present disclosure, the alkyl groups and substituted alkyl groups that might be present on the phthalocyanine dyes, naphthalocyanine dyes, and bridged phthalocyanine/naphthalocyanine dyes described herein can be lower alkyl groups or lower substituted alkyl groups.

In an embodiment of the present disclosure, M is a monovalent, a divalent, a trivalent, a tetravalent or a pentavalent metal ion, or transition metal ion. Generally, M is complexed with the nitrogen atoms of the pyrrole moieties at the nucleus of the phthalocyanine and/or naphthalocyanine components. In an embodiment of the disclosure, the number of OR group(s), linked with M, depends up on the valency of the metal M. Thus, in an embodiment, when the M is a trivalent metal, one linked group OR will be present. Likewise, if the metal M is tetravalent, there will be two groups OR of the above mentioned species. The linked OR group provides one or more of further solubility, further dispersibility and other functionality including, but not limited to, changing the absorption range of the phthalocyanine dyes, naphthalocyanine dyes, and bridged phthalocyanine/naphthalocyanine dyes for the purposes of some embodiments of the present invention.

In an embodiment of the present disclosure, in the phthalocyanine dyes according to the general structures I to VIII; and, in another embodiment, in the naphthalocyanine dyes according to the general structures IX to XIV; and in yet another embodiment, in the bridged phthalocyanine/naphthalocyanine dyes according to the general structures XV to XVII; the OR group bound to M can be replaced with a halogen. In another embodiment, the halogen can be F, Cl or Br. In still another embodiment, R can be H.

In an embodiment of the present disclosure, in the phthalocyanine dyes according to the general structures I to VIII; and, in another embodiment, in the naphthalocyanine dyes according to the general structures IX to XIV; and in yet another embodiment, in the bridged phthalocyanine/naphthalocyanine dyes according to the general structures XV to XVII; M can be a metal selected from the group consisting of Mg, Zn, Cd, Hg, Al, Ga, In, Tl, Si, Ge, Sn, Pb, P, As, Sb, Bi, Sc, Y, La, Ce, Pr, Nd, Pm, Sm, Eu, Gd, Tb, Dy, Ho, Er, Tm, Yb, Lu, Ti, Zr, Hf, V, Nb, Ta, Cr, Mo, W, Mn, Tc, Re, Fe, Ru, Os, Co, Rh, Ir, Ni, Pd, Pt, Cu, Ag, and Au. In another embodiment, M can be a metal selected from the group consisting of In, Mn, Y, Sc, Ga, Cu, Ni, Co, Al, Mg, Fe, Sn, and Si. In yet another embodiment, the metal M can be In. In still another embodiment, the metal M can be Cu.

In an embodiment, in the phthalocyanine dyes according to the general structures I to VIII; and, in another embodiment, in the naphthalocyanine dyes according to the general structures IX to XIV; and in yet another embodiment, in the bridged phthalocyanine/naphthalocyanine dyes according to the general structures XV to XVII; for $R^1$ or $R^2$, the number of carbon atoms of the alkyl or aryl group can be from 1 to 20. In still another embodiment for $R^1$ or $R^2$ the number of carbon atoms of the alkyl or a group can be from 1 to 30. In another embodiment, $R^1$ can be, independently, an alkyl group, having the formula $C_nH_{2n+1}$, wherein n ranges from 1 to 8. In yet another embodiment, $R^1$ can be, independently, an alkyl group, having the formula $C_nH_{2n+1}$, wherein n can be from 1 to 4.

In another embodiment, in the phthalocyanine dyes according to the general structures I to VIII; and, in another embodiment, in the naphthalocyanine dyes according to the general structures IX to XIV; and in yet another embodiment, in the bridged phthalocyanine/naphthalocyanine dyes according to the general structures XV to XVII; n can be 1 to 500.

In an embodiment, in the bridged phthalocyanine/naphthalocyanine dyes according to the general structures XV to XVII; $R^3$ can be selected from the group consisting of $CH_2$, $CH_2CH_2$, CO, O, NH, S, $SO_2$, $SO_2NH$, COO, CONH, and combinations thereof. In another embodiment, $R^3$ can be selected from the group consisting of CO, O, $CH_2$, and $SO_2$. In still another embodiment, $R^3$ can be oxygen.

In an embodiment, in the phthalocyanine dyes according to the general structures I to VIII; and, in another embodiment, in the naphthalocyanine dyes according to the general structures IX to XIV; and in yet another embodiment, in the bridged phthalocyanine/naphthalocyanine dyes according to the general structures XV to XVII; the substituent X group can be attached to various aryl groups of the phthalocyanine dyes and the naphthalocyanine dyes. In an embodiment, the substituent group X can be a soluble group that, at least, provides water solubility-dispersibility to the phthalocyanine dyes and the naphthalocyanine dyes according to embodiments of the present disclosure. Thus, in an embodiment, X can be independently selected from OH, $COOM^1$, $SO_3M^1$, $PO_3M^1_2$, $NR^4_4{}^+Y^-$, and $(CH_2CH_2O)_mCH_3$, where $M^1$ is independently selected from H, a monovalent metal ion, and $NR_4{}^+$; where Y is independently selected from a halogen, sulfate, sulfonate, $OH^-$, and $OSO_3{}^-$; where $R^4$ is H, alkyl, substituted alkyl, aryl, or substituted aryl; and where m ranges from 1 to 500.

In an embodiment, in the phthalocyanine dyes according to the general structures I to VIII; and, in another embodiment, in the naphthalocyanine dyes according to the general structures IX to XIV; and in yet another embodiment, in the bridged phthalocyanine/naphthalocyanine dyes according to the general structures XV to XVII; X can be $SO_3 M^1$, with $M^1$ being independently selected from H or a monovalent metal cation selected from the group consisting of $Na^+$, $K^+$ or $NR_4{}^+$, wherein R is independently selected from H, an alkyl group, a substituted alkyl group, an aryl group and a substituted aryl group. In another embodiment, X can be $SO_3 M^1$, where $M^1$ is Na.

In an embodiment, the dye can further comprises water soluble substituents attached to at least one aryl group of the phthalocyanine dye, the naphthalocyanine dye, or the bridged phthalocyanine/naphthalocyanine dye. By "aryl group" of the phthalocyanine dye, the naphthalocyanine dye, or the bridged phthalocyanine/naphthalocyanine dye, it is meant either a benzene ring moiety (i.e., benzene moiety or benzo moiety) of the respective component or a benzene ring-derived substituent group attached to a benzene moiety of the component (e.g., a phenyl group substituent or phenyl containing group substituent). In some embodiments, more than one water soluble groups are attached to an aryl group of the phthalocyanine dye, the naphthalocyanine dye, or the bridged phthalocyanine/naphthalocyanine dye.

In an embodiment of the present disclosure, the phthalocyanine dye, as described herein, can be prepared by heating to about 200° C. the mixture from the corresponding metal compound and appropriate isoindoline, dicyano, dicarboxylic acid or anhydride with urea. Ammonium molybdate can be added as catalyst to facilitate the reaction faster. A small quantity of high boiling solvent such as dimethyl formamide, nitrobenzene, triachlobenzene or chloronaphthalene can be added to increase the homogeneity of the mixture. After the reaction, the pigment can be isolated by washing with isopropanol or by acid pasting method. In the acid pasting method, the pigment is dissolved in sulfuric acid and precipitated in crushed ice. It can further be washed with water to remove acid and other impurities. The pigment obtained is sulfonated with fuming sulfuric acid and then the water-soluble sulfonic acid obtained is neutralized with base such as sodium carbonate to obtain the sodium salt of the dye. Alternatively, sulfonate substituted dicyano, dicarboxylic acid or anhydride can be used to directly making sulfonated phthalocyanine derivatives in a single step. The foregoing is not intended to be limiting, but provides one reaction scheme that would enable the manufacturing of the present compounds. Further examples are provided herein In an embodiment of the present disclosure, the naphthalocyanine dye, as described herein, can be prepared from the corresponding naphthalonitrile compounds with the desired stoichiometry. In an embodiment, these compounds are mixed together with all the precursors and heated to higher temperature. In an embodiment, the naphthalocyanine as described herein could be further purified by column chromatography separation and/or recrystallization techniques; or other purifying techniques as known in the art. In an embodiment, the naphthalocyanine compounds can be made in a single step synthetic process from their precursors, such as aromatic 2,3-dicyano- or 2,3-carboxylic acids or anhydrides and their corresponding metallic compounds. These compounds can be made into water soluble compounds by incorporating sulfonate or other water soluble groups on the aromatic rings. Alternatively, in another embodiment, if the dyes contain aromatic 2,3-dicyano- or 2,3-dicarboxylic acids or anhydrides and their corresponding metallic compounds, they can be water soluble without the need for incorporating addition water soluble groups.

In an embodiment of the present disclosure, the bridged phthalocyanine/naphthalocyanine dye, as described herein, can be prepared from the appropriate bridged pthalo- or naphthalo compounds of isoindoline, dicyano, dicarboxylic acid or anhydride as one of the components in the above mentioned process.

The NIR-absorbing phthalocyanine dye embodiments, the NIR-absorbing naphthalocyanine dye embodiments, and the NIR-absorbing bridged phthalocyanine/naphthalocyanine dye embodiments of the present invention can be used in water-based ink systems, for example, inkjet inks for inkjet printers. Such dyes and inks can be used for a variety of applications including, but not limited to, print quality, print authenticity, security, print authentication, RFID tags and barcodes, for example.

In the application involving print quality of inkjet printers, an inkjet print head can be used to eject ink droplets very accurately in predetermined locations on a substrate. The quantity of nozzles, in an inkjet print head, can range from several nozzles to more than 400 nozzles, each for ejecting ink droplets. Generally, the more nozzles present in the print head the better the print quality and speed. However, any of the nozzles in the print head may get blocked or clogged from time to time, possibly due to particles in the inkjet ink dispersions or dry conditions. When a nozzle is clogged or partially blocked, the ink may at least streak on the substrate, and might leave unprinted or partially printed streak mark. Streaking ink equates to poor print quality. By incorporating the NIR-absorbing phthalocyanine dye embodiments and/or naphthalocyanine dye embodiments of the present disclosure with the inkjet ink, an opportunity to monitor print quality and nozzle operation during printing can be provided.

The NIR-absorbing phthalocyanine dyes, NIR-absorbing naphthalocyanine dyes, and NIR-absorbing bridged phthalocyanine/naphthalocyanine dyes according to embodiments of the present disclosure further provide opportunities to monitor and assess print authenticity, as well as other areas that use ink, because of the unique absorption range of the NIR-absorbing phthalocyanine dyes, NIR-absorbing naphthalocyanine dyes, and NIR-absorbing bridged phthalocyanine/naphthalocyanine dyes according to embodiments of the present disclosure.

In an embodiment, the present disclosure refers to an inkjet ink formulation comprising the phthalocyanine dye, the naphthalocyanine dye, and/or bridged phthalocyanine/naphthalocyanine dye, as defined herein, wherein said dyes can be either soluble or dispersed in the inkjet ink. The inkjet ink formulation can comprise an inkjet ink and said dyes, such as described in the present disclosure, dispersed or dissolved in the inkjet ink. The dyes can be stable in the inkjet ink for the shelf life of the inkjet ink. In the inkjet ink formulation, the dyes can have a NIR absorption that is shifted into a range of from 700 to 1000. In another embodiment, the dyes can have a NIR absorption that is shifted to greater than 800 nm, which is distinguishable from any absorption in the visible range of spectrum (400-750 nm) that the inkjet ink might have. The inkjet ink formulation embodiment of the present invention has numerous applications including, but not limited to print quality, as mentioned above.

In some embodiments, the inkjet ink can be a water soluble inkjet ink (i.e., aqueous ink) based on a mixture of water, glycol and dyes or pigments, for example for most everyday printing applications. In other embodiments, the inkjet ink can be a solvent-based ink made with volatile organic compounds (VOC). The solvent-based inks can be used in printing of vinyl substrates (e.g., billboards and banners). In still other embodiments, the inkjet ink can be either a UV-curable ink that comprises acrylic monomers with an initiator that is cured by exposure to strong UV-light or a dye sublimation ink that comprises a sublimation dye and is used to print directly or indirectly on to fabrics having polyester fibers, for example. All of the inkjet inks can provide a variety of colors using either the additive red-green-blue (RGB) color model or the subtractive cyan-magenta-yellow-key (CMYK) color model. In an embodiment, inkjet ink comprising near IR absorbing dye can be a clear ink, without any visible colorants, i.e. without any CMY colorants in it.

In an embodiment, the present disclosure refers to a printing method using inkjet ink formulations comprising the phthalocyanine dye, the naphthalocyanine dye, and/or bridged phthalocyanine/naphthalocyanine dye such as described herein. In an embodiment, the method can include using a printer system. A printing system can include an inkjet printer, installed with an optical sensing system, which includes an infrared light emitting diode (LED) device (illuminant) configured to emit infrared radiation that matches the spectral absorbance of the NIR phthalocyanine dye, NIR naphthalocyanine dye, and/or NIR bridged phthalocyanine/naphthalocyanine dye in the inks, i.e., emits electromagnetic light energy within the near infrared spectrum, and an infrared sensor coupled to the LED device. The sensor can be capable of detecting absorbance in response to illumination by the LED. At least approximate matching between the emitted electromagnetic energy and the peak absorbance of the NIR material can be desired, e.g., peak absorbance of the dye within 50 nm of the infrared light energy emitted from the LED. The sensing system may be a through-page sensing system, which measures transmissive light, and in which the illuminant and the infrared sensor are positioned on opposite sides of the print medium. The sensing system may also be a reflectance-measuring system, which measures the reflected light, and in which the illuminant and the infrared sensor are positioned on the same side of the print medium. When the inks are printed on a paper, the presence of the NIR absorbing dye can be detected using the LED device coupled with the sensor as discussed above. The NIR absorbing dye can absorb some portion of the emitted light from the LED. The decrease in LED intensity can be detected by the sensor, which then registers the presence of the NIR dye. By adding a sufficient amount of NIR absorbing dye to the inks, a method of detection can be provided that is independent of the ink colors.

In another embodiment of the present disclosure, a detection system for a NIR-absorbing phthalocyanine dye, NIR-absorbing naphthalocyanine dye, and NIR-absorbing bridged phthalocyanine/naphthalocyanine dye with extended conjugation can be provided. The detection system provides detection of the phthalocyanine dye, naphthalocyanine dye, and bridged phthalocyanine/naphthalocyanine dye in a variety of applications, as mentioned above from print quality to print authentication, for example. In some embodiments, the detection system can be incorporated into an inkjet printer.

FIG. 1 illustrates a block diagram of a detection system 300 for an inkjet printer according to an embodiment of the present disclosure. In an embodiment, the detection system 300 can comprise an NIR illumination source 310 that emits infrared light at a wavelength between 700 nm and 1000 nm. The NIR illumination source 310 may be light emitting diode (LED), for example. In an embodiment, the detection system 300 can further comprise an NIR sensor 320 that detects the infrared light from the NIR illumination source 310. The NIR sensor 320 may be a photodiode that detects radiation between 700 nm and 1000 nm of wavelength, for example. The detection system 300 can further comprise a medium 330 that comprises an NIR-absorbing phthalocyanine dye, NIR-absorbing naphthalocyanine dye, or NIR-absorbing bridged phthalocyanine/naphthalocyanine dye such as described in the present disclosure. In the embodiment illustrated in FIG. 1, the medium 330 can be an inkjet ink 330. In another embodiment, the medium 330 can be a media substrate on which the inkjet ink comprising NIR-absorbing phthalocyanine dyes, NIR-absorbing naphthalocyanine dyes, or NIR-absorbing bridged phthalocyanine/naphthalocyanine dyes is printed on. The inkjet ink 330 can comprise phthalocyanine dye, naphthalocyanine dyes, and/or bridged phthalocyanine/naphthalocyanine dyes such as described in the present disclosure dispersed in the inkjet ink 330. As such, the inkjet ink 330 can absorb light in the NIR range. In an embodiment, the inkjet ink 330 can absorb light at greater than 800 nm. In an embodiment, the inkjet ink 330 can be dispensed through a nozzle 340 of an inkjet print head of an inkjet printer 350. The NIR illumination source 310 can be directed at an output path of the nozzle 340 to illuminate the inkjet ink 330 that is dispensed by the nozzle 340. The NIR sensor 320 can be directed at the output path and the illumination path.

According to embodiments of the present disclosure, in an example of detecting print quality from the inkjet printer 350, when the nozzle 340 of the inkjet print head is operating efficiently, the inkjet ink 330 can emanate from the nozzle output in the output path. The light from the illumination source 310 can be absorbed by the phthalocyanine dye, naphthalocyanine dye, and/or bridged phthalocyanine/naphthalocyanine dye in the inkjet ink 330 and the NIR sensor 320 does not detect a change in the light (or a change in an amount of light) from the illumination source 310. When the nozzle 340 becomes clogged, whether due to the inkjet ink 330 inside the nozzle 340 drying up or for another reason, little or no inkjet ink 330 can be dispensed by the nozzle 340. The light from the NIR illumination source 310 can then no longer be absorbed if the inkjet ink 330 is not dispensed from the nozzle output. As such, NIR sensor 320 can begin detecting the light (e.g., detects a change in either the light or an amount of the light) from the NIR illumination source 310. The detected light by the NIR sensor 320 can trigger the NIR sensor 320 to communicate to the inkjet printer 350 that the nozzle 340 is not operating correctly. The inkjet printer 350 can use the communication from the NIR sensor 320 to compensate for the clogged nozzle 340, such that print quality from the inkjet printer is maintained.

The following examples illustrate a number of embodiments of the present compositions, systems, and methods that are presently known. However, it is to be understood that the following are only exemplary or illustrative of the application of the principles of the present compositions, systems, and methods. Numerous modifications and alternative compositions, methods, and systems may be devised by those skilled in the art without departing from the spirit and scope of the present systems and methods. The appended claims are intended to cover such modifications and arrangements. Thus, while the present compositions, systems, and methods have been described above with particularity, the following examples provide further detail in connection with what are presently deemed to be the acceptable embodiments.

EXAMPLE 1

Table I below illustrates some phthalocyanine dyes, some naphthalocyanine dyes, and some bridged phthalocyanine/naphthalocyanine dyes according to embodiments of the present invention:

TABLE I

1)

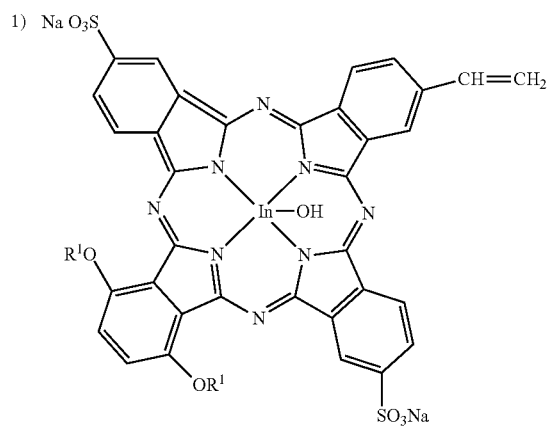

TABLE I-continued
2) 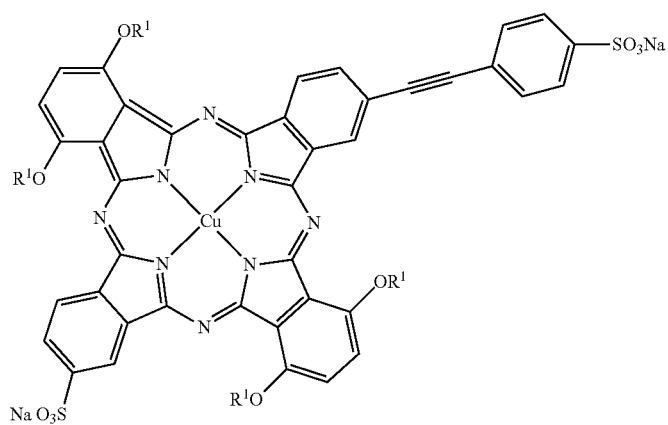
3) 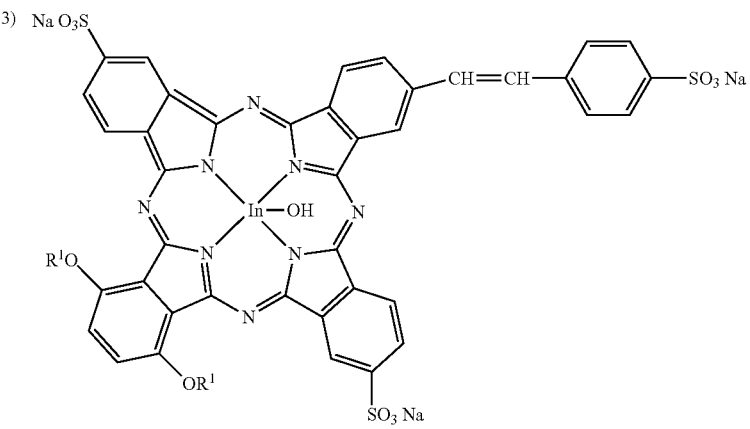
4) 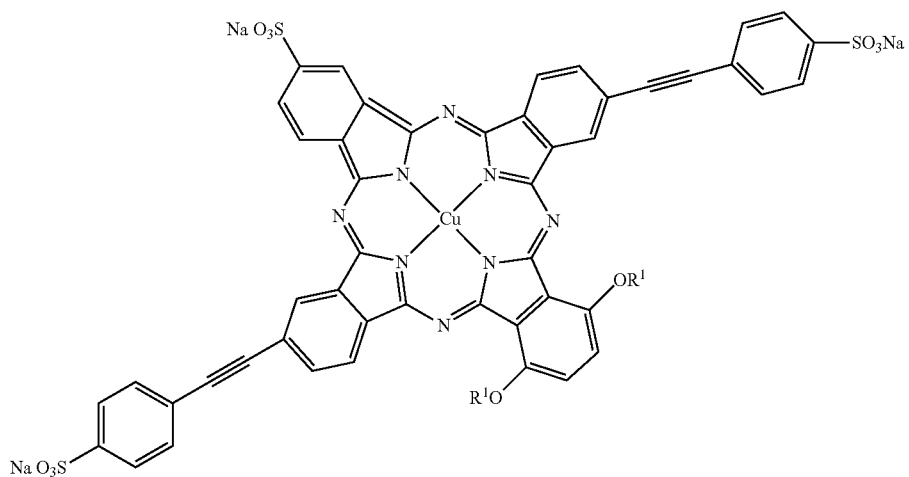

TABLE I-continued
5)
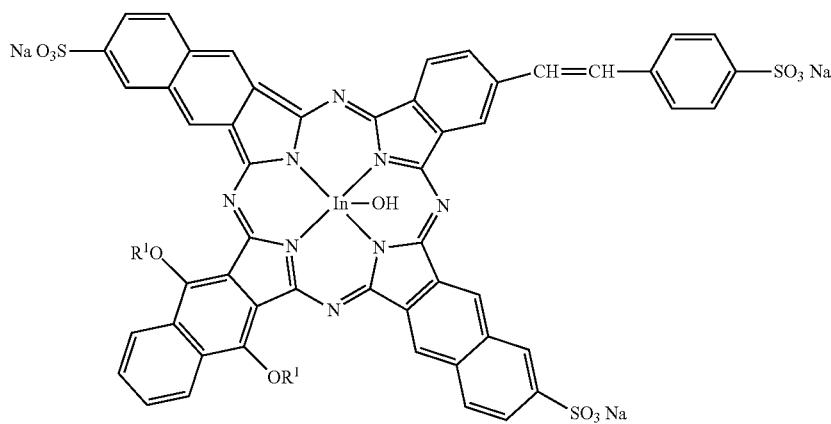
6)
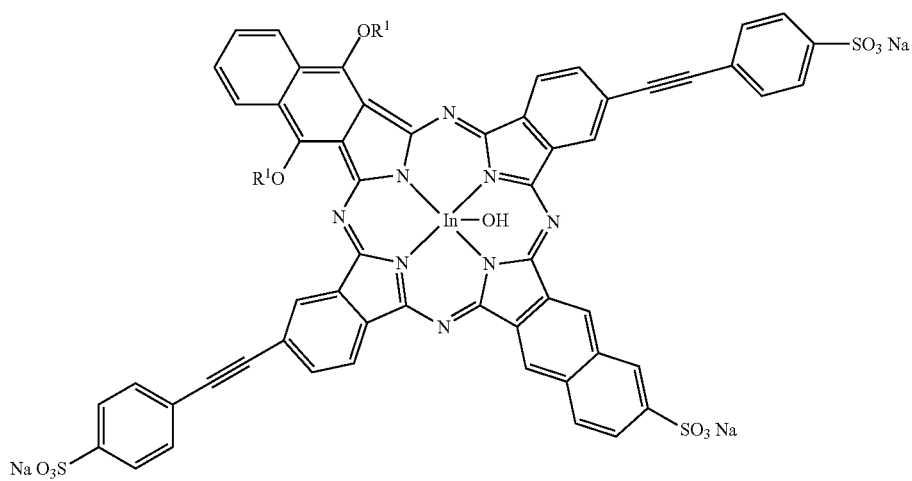
7)
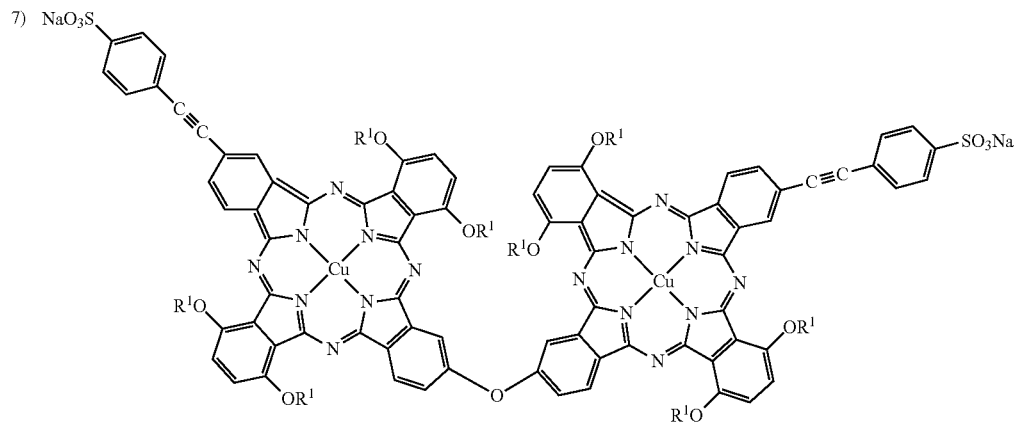

TABLE I-continued

8) 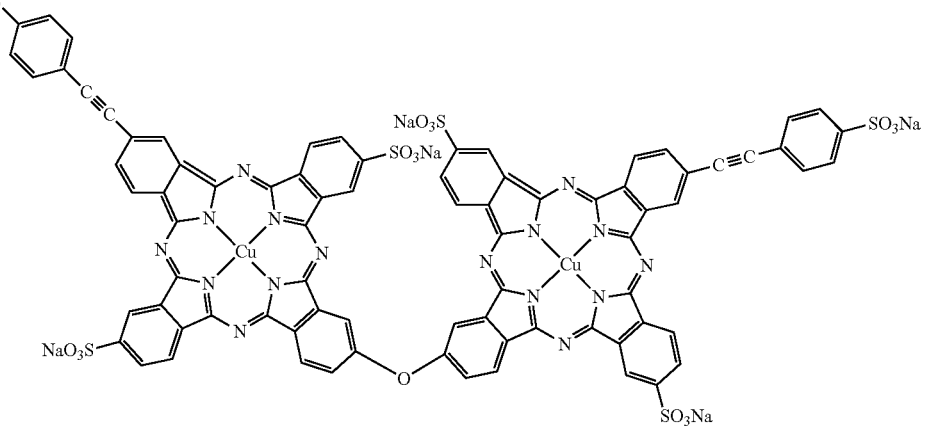

9) 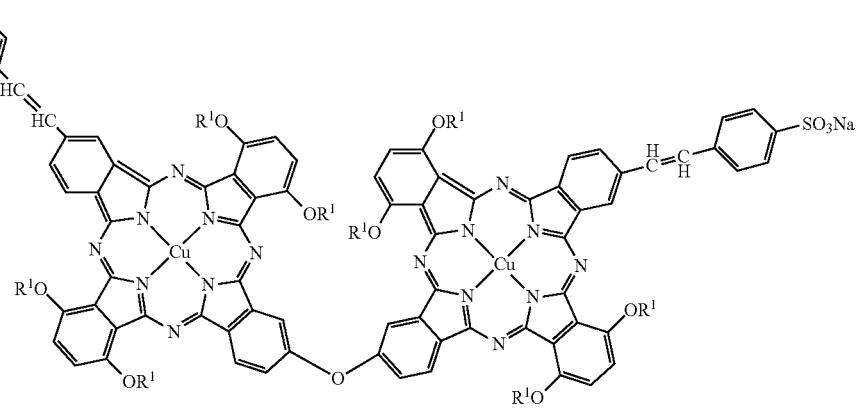

10) 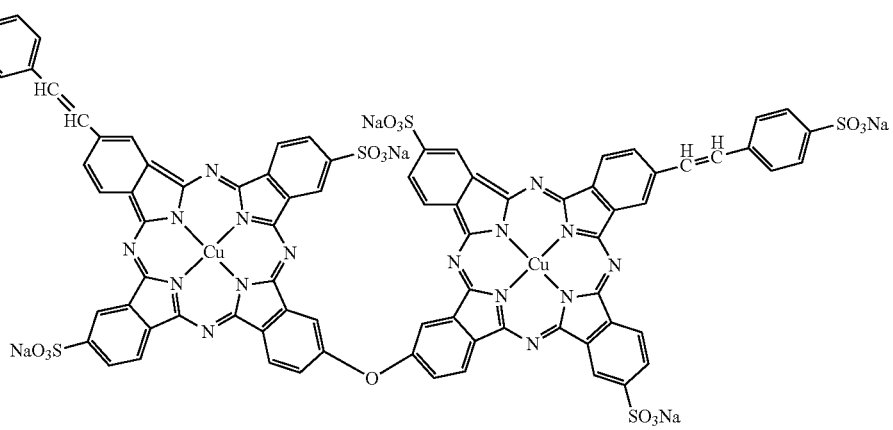

EXAMPLE 2

A phthalocyanine dye comprising, in particular, copper phthalocyanine sulfonate sodium salt is formulated. The phthalocyanine compound has the chemical structure 2 (from Table 1), wherein $R^1$ is butyl.

To make the phthalocyanine compound of the example 2 above, 2.92 grams of 1,4-dibutoxy-2,3-phthalic anhydride, 0.74 g of phthalic anhydride, 1.2 g of copper(II) bromide, 1.24 g of 4-phenylethynylphthalic anhydride, 6 g of urea and 0.08 g of ammonium molybdate are heated to 20° C. for 2 h and cooled. The product obtained is washed with water followed by isopropanol. After drying it is sulfonated with 30 ml of fuming sulfuric acid containing 20% sulfur trioxide for 12 h. It is poured in crushed ice and washed with cold water to remove excess acid. The product obtained is neutralized with sodium carbonate to a pH of 7.2. Further purification is possible by dialysis against water until it is free from soluble inorganic salts. Water is removed to obtain the dye.

EXAMPLE 3

A naphthalocyanine dye comprising, in particular, an indium naphthalocyanine sulfonate sodium salt is formulated. The naphthalocyanine compound has the chemical structure 6 (from Table 1), wherein $R^1$ is butyl.

To make the naphthalocyanine compound of the example 3 above, 1.71 grams of 1,4-dibutoxy-2,3-naphthalic anhydride, 0.99 g of 2,3-naphthalic anhydride, 1.2 g of indium chloride, 1.71 g of 4-phenylethynylphthalic anhydride, 6 g of urea and 0.08 g of ammonium molybdate are heated to 20° C. for 2 h and cooled. The product obtained is washed with water followed by isopropanol. After drying it is sulfonated with 30 ml of fuming sulfuric acid containing 20% sulfur trioxide for 12 h. It is poured in crushed ice and washed with cold water to remove excess acid. The product obtained is neutralized with sodium carbonate to a pH of 7.2. Further purification is possible by dialysis against water until it is free from soluble inorganic salts. Water is removed to obtain the dye.

EXAMPLE 4

A phthalocyanine dye comprising, in particular, bridged copper phthalocyanine sulfonate sodium salt is formulated. This compound has the chemical structure 7 (from Table 1), wherein $R^1$ is butyl.

To make the bridged phthalocyanine compound of the example 4 above, 2.92 grams of 1,4-dibutoxy-2,3-phthalic anhydride, 0.78 g of 4,4'-oxydiphthalic anhydride, 1.2 g of copper(II) bromide, 1.24 g of 4-phenylethynylphthalic anhydride, 6 g of urea and 0.08 g of ammonium molybdate are heated to 20° C. for 2 h and cooled. The product obtained is washed with water followed by isopropanol. After drying it is sulfonated with 30 ml of fuming sulfuric acid containing 20% sulfur trioxide for 12 h. It is poured in crushed ice and washed with cold water to remove excess acid. The product obtained is neutralized with sodium carbonate to a pH of 7.2. Further purification is possible by dialysis against water until it is free from soluble inorganic salts. Water is removed to obtain the dye.

EXAMPLE 5

An ink composition, containing the phthalocyanine dye, naphthalocyanine dye, or bridged phthalocyanine/naphthalocyanine dye as listed in Table I can be prepared using the an ink vehicle as found in Hewlett Packard's Magenta Ink, commercial ink cartridge #HP940. In one embodiment, the dyes can be prepared in an aqueous based ink containing organic cosolvents, surfactant, and biocide.

While the disclosure has been described with reference to certain preferred embodiments, those skilled in the art will appreciate that various modifications, changes, omissions, and substitutions can be made without departing from the spirit of the disclosure. It is intended, therefore, that the invention be limited only by the scope of the following claims.

What is claimed is:

1. A dye comprising a phthalocyanine dye represented by one of the general structures I to VIII, a naphthalocyanine dye represented by one of the general structures IX to XIV, or a bridged phthalocyanine/naphthalocyanine dye represented by one of the general structures XV to XVII:

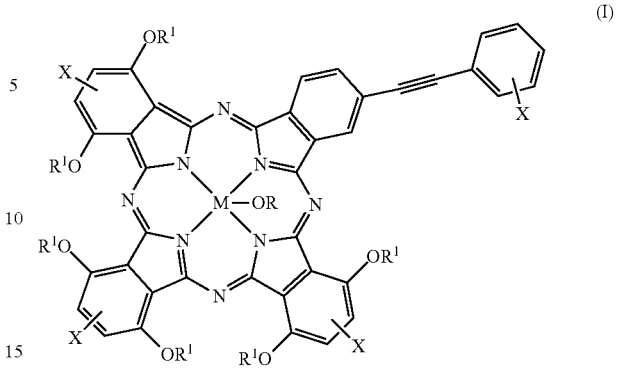

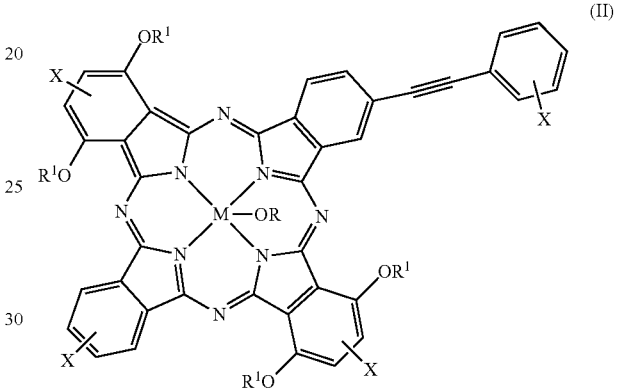

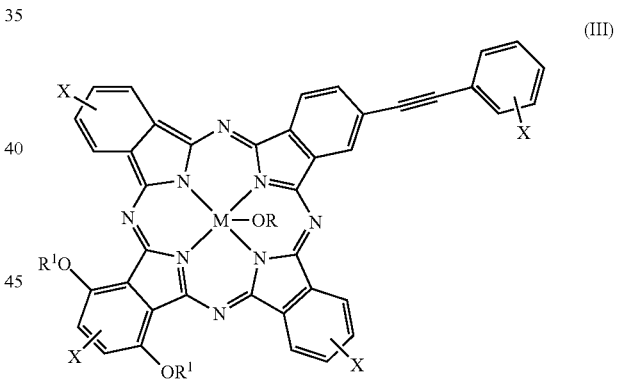

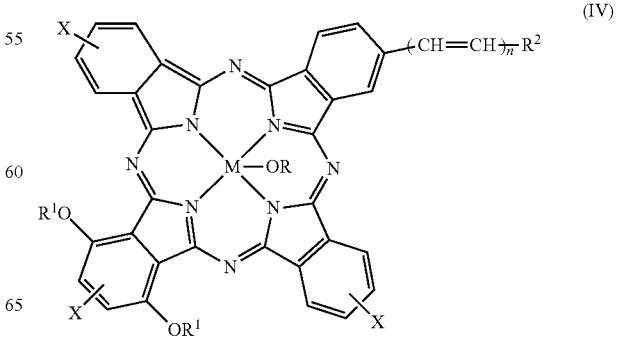

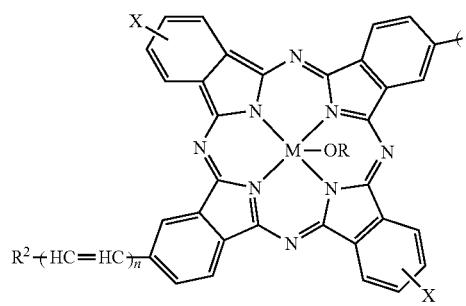
(V)
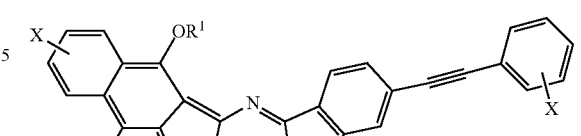
(IX)
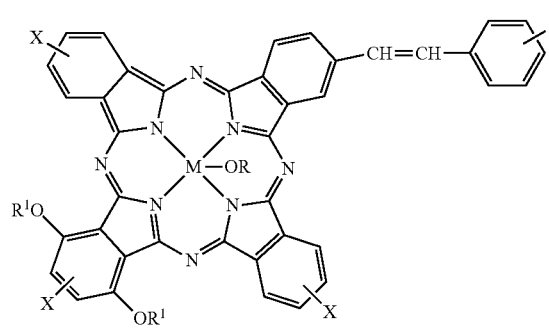
(VI)
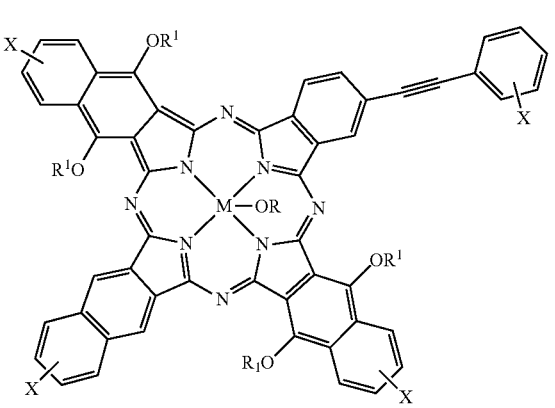
(X)
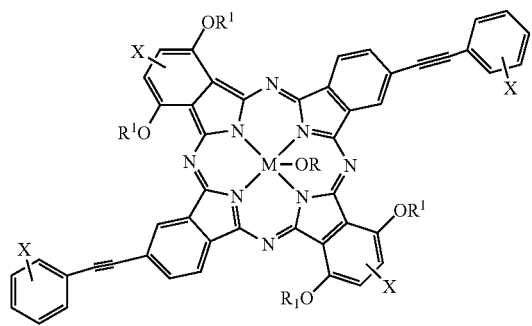
(VII)
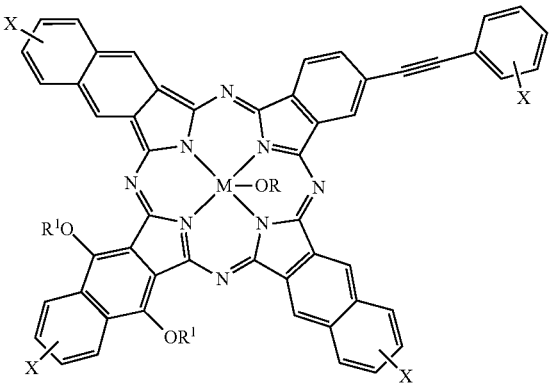
(XI)
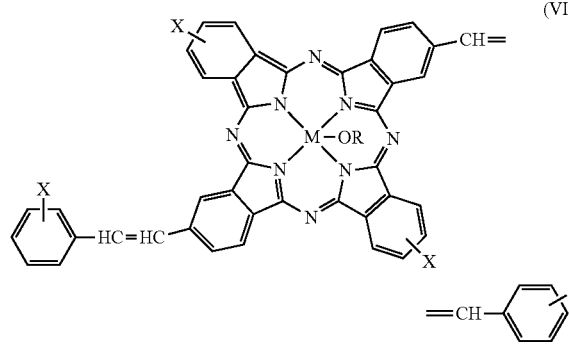
(VIII)
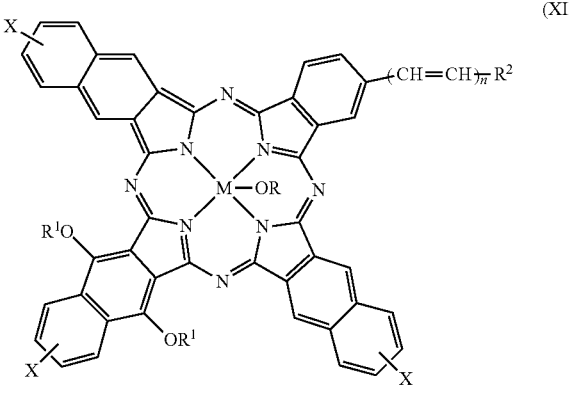
(XII)

33
-continued
(XIII)
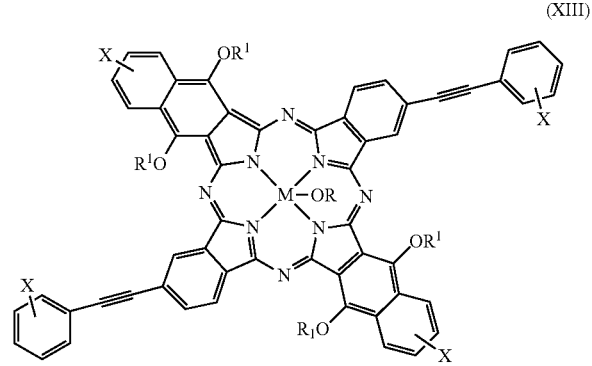
(XIV)
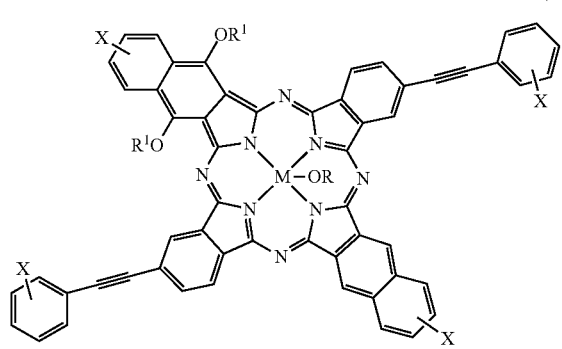
(XV)
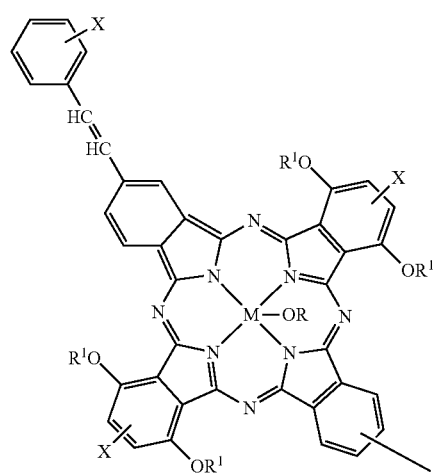
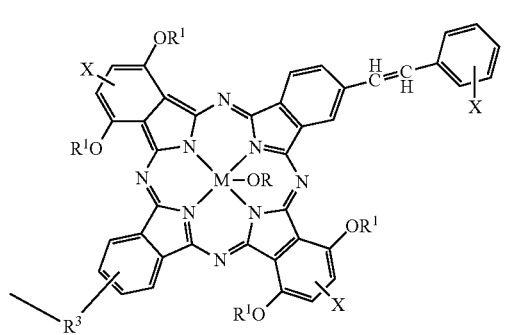
34
-continued
(XVI)
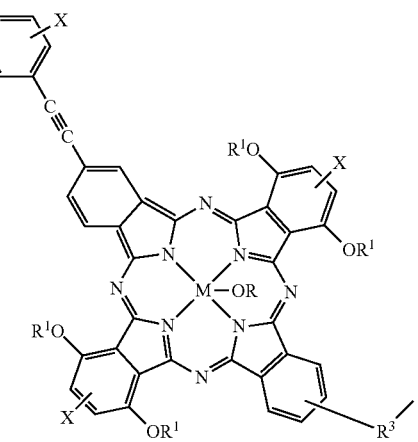
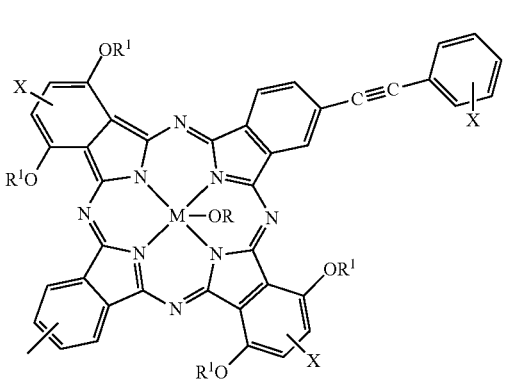
(XVII)
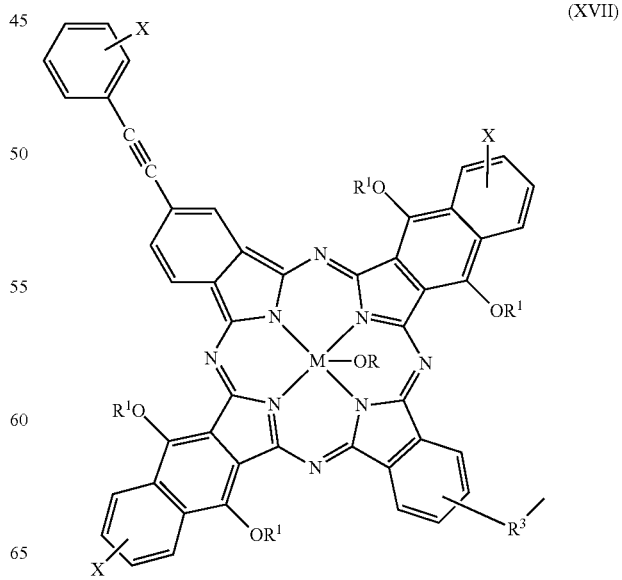

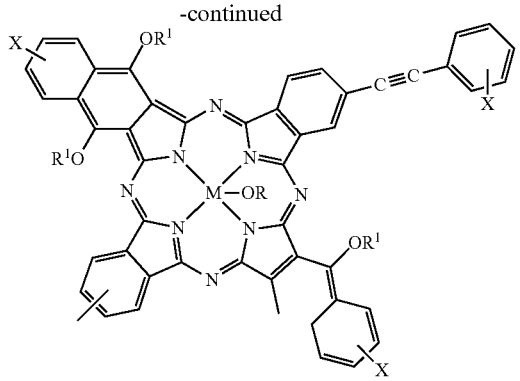

wherein:

R is H, alkyl substituted alkyl, or $SO_3M^1$;

$M^1$ is H, monovalent cations, or $NR^4_4{}^+$;

OR can be replaced by a halogen;

$R^1$ is H, alkyl, or substituted alkyl or aryl with carbons from 1 to 50;

$R^2$ is H;

n is 1 to 5000;

$R^3$ is a divalent linking group;

M is a monovalent, a divalent, a trivalent, a tetravalent or a pentavalent metal ion or transition metal ion;

X is H, alkyl, substituted alkyl, aryl, substituted aryl, $SO_3M^1$, OH, $OCOR^2$; $COOM^1$, $PO_3M^1{}_2$, $NR^4_4{}^+Y^-$, or $O(CH_2CH_2O)_mCH_3$ wherein m=1 to 500, where at least one of the X in the dye is sulfonate, phosphate or polyethylene glycol, where Y is independently selected from the group consisting of: a halide, sulfate, sulfonate, $OH^-$, and $OSO_3{}^-$; and $R^4$ is H, alkyl, substituted alkyl, aryl, or substituted aryl.

2. The dye of claim 1, wherein the dye is a phthalocyanine dye represented by one of the general structures I to VIII.

3. The dye of claim 2, wherein the phthalocyanine dye is selected from the group consisting of:

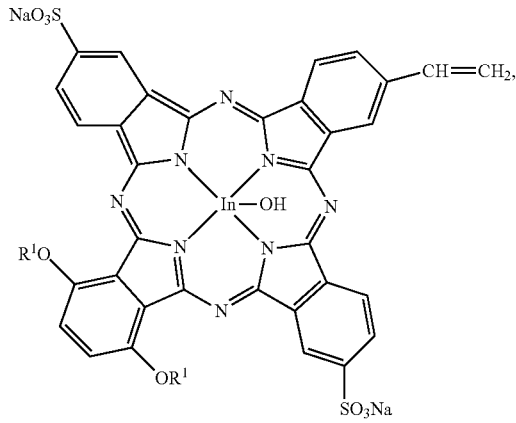

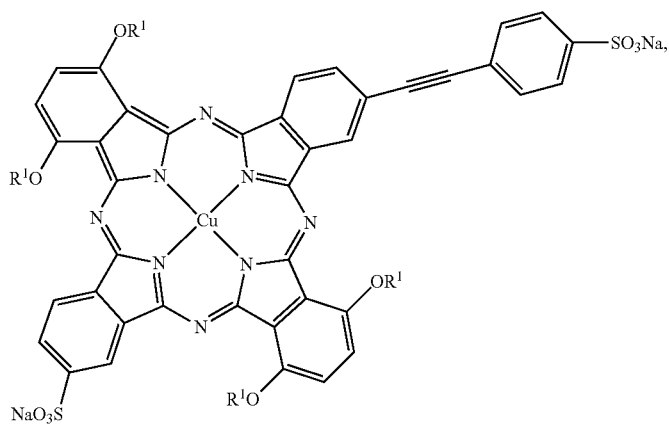

-continued
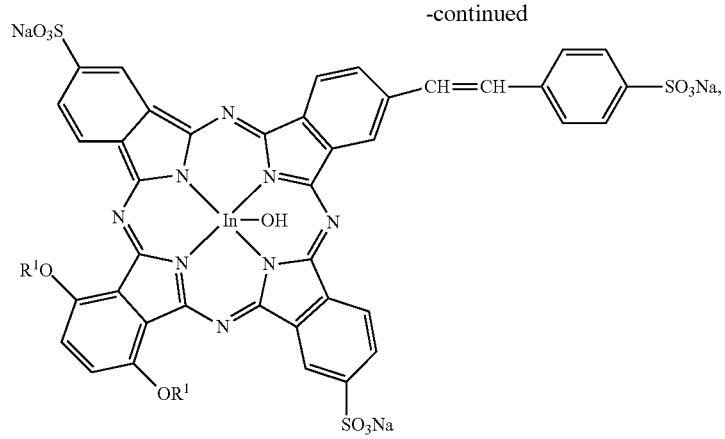
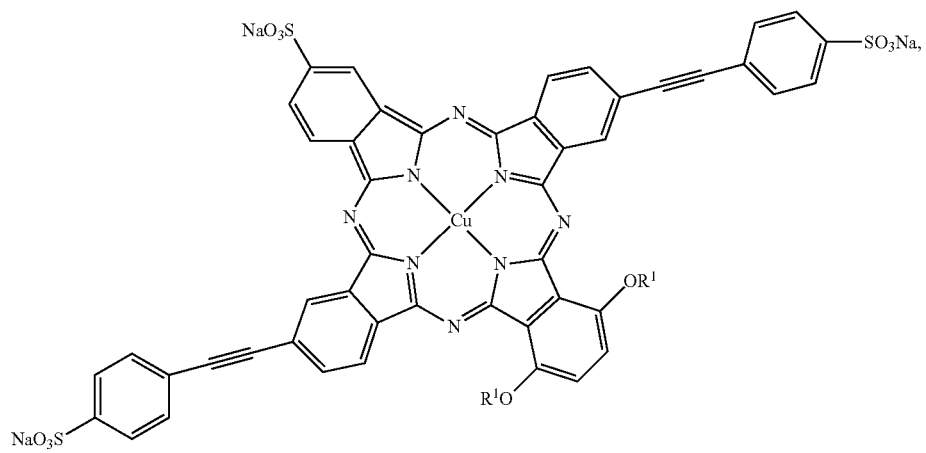
and mixtures thereof.
4. The dye of claim 1, wherein the dye is a naphthalocyanine dye represented by one of the general structures IX to XIV.
5. The dye of claim 4, wherein the naphthalocyanine dye is selected from the group consisting of
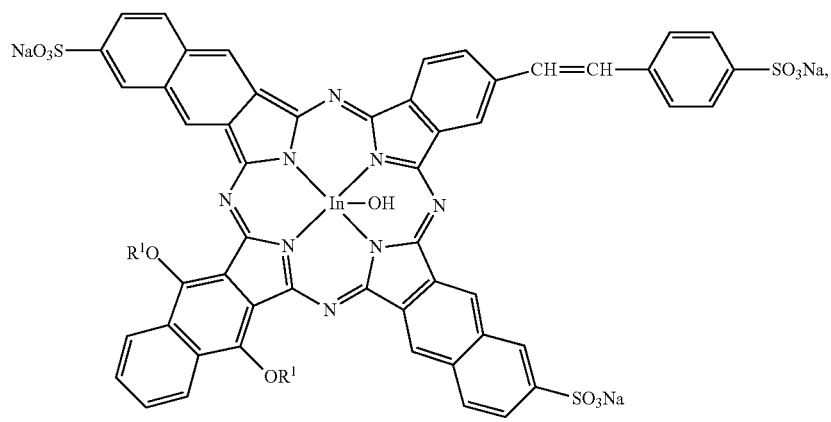

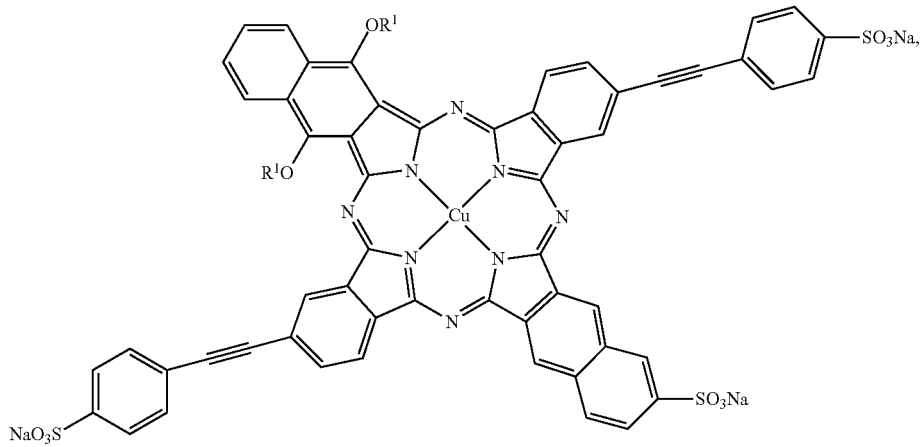
and mixtures thereof.
6. The dye of claim 1, wherein the dye is a bridged phthalocyanine/naphthalocyanine dye represented by one of the general structures XV to XVII.
7. The dye of claim 6, wherein the bridged phthalocyanine/naphthalocyanine dye is selected from the group consisting of
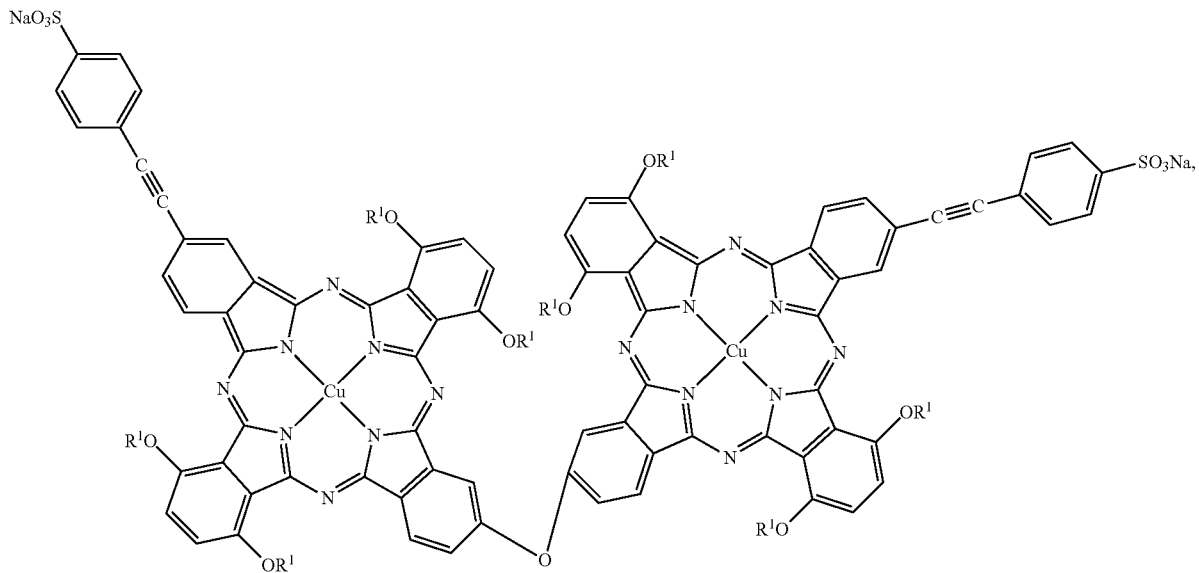

-continued
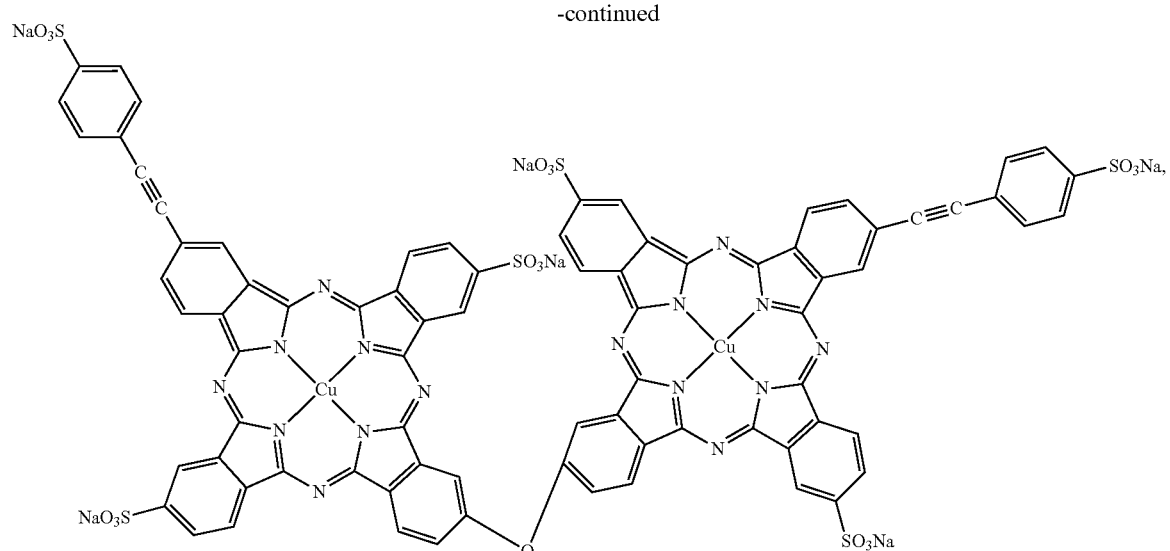
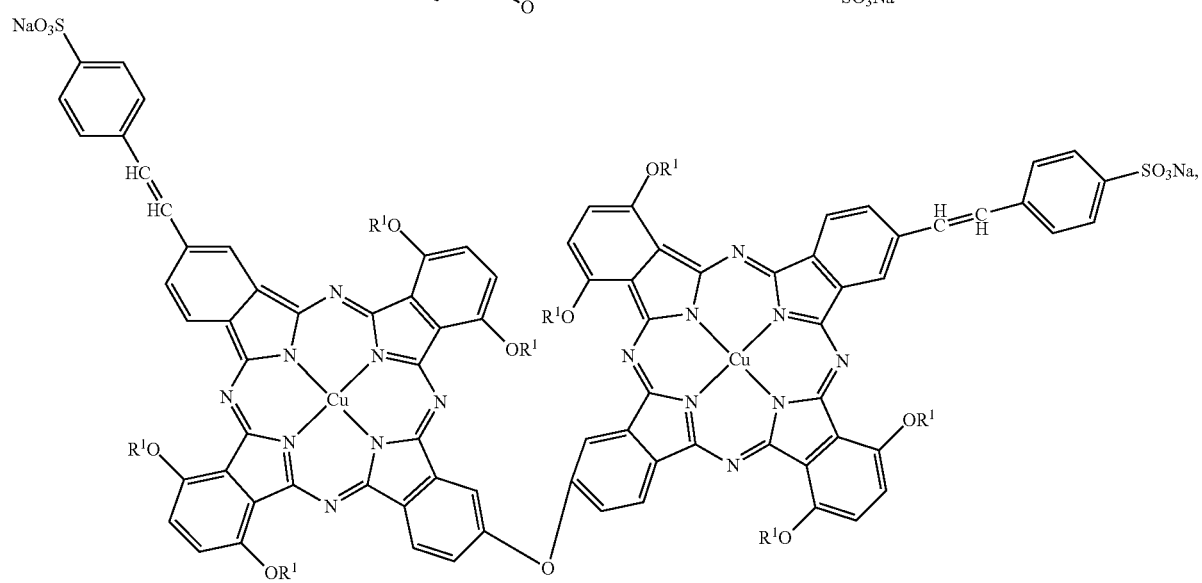
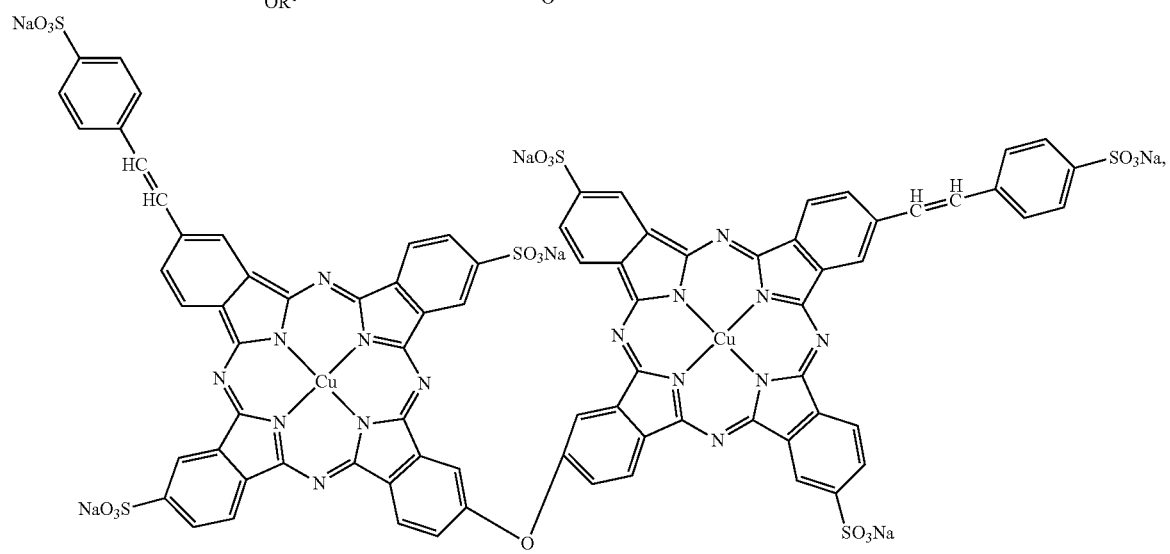
and mixtures thereof.

8. The dye of claim 1, wherein R is hydrogen.

9. The dye of claim 1, wherein OR is replaced by a halogen.

10. The dye of claim 1, wherein for $R^1$ or $R^2$, the number of carbon atoms of the alkyl or aryl group is from 1 to 30.

11. The dye of claim 1, wherein $R^1$ is, independently, an alkyl group, having the formula $C_nH_{2n+1}$, wherein n ranges from 1 to 8.

12. The dye of claim 1, wherein n is 1 to 500.

13. The dye of claim 1, wherein M is a metal selected from the group consisting of Mg, Zn, Cd, Hg, Al, Ga, In, Tl, Si, Ge, Sn, Pb, P, As, Sb, Bi, Sc, Y, La, Ce, Pr, Nd, Pm, Sm, Eu, Gd, Tb, Dy, Ho, Er, Tm, Yb, Lu, Ti, Zr, Hf, V, Nb, Ta, Cr, Mo, W, Mn, Tc, Re, Fe, Ru, Os, Co, Rh, Ir, Ni, Pd, Pt, Cu, Ag, and Au.

14. The dye of claim 1, wherein the metal M is In.

15. The dye of claim 1, wherein the metal M is Cu.

16. The dye of claim 1, wherein X is $SO_3M^1$; $M^1$ is independently selected from the group consisting of H and a monovalent metal cation, wherein the monovalent metal cation is independently selected from the group consisting of $Na^+$, $K^+$ and $NR_4^+$, wherein $R^4$ is independently selected from the group consisting of H, an alkyl group, a substituted alkyl group, an aryl group and a substituted aryl group.

17. The dye of claim 1, wherein X is $SO_3Na$.

18. The dye of claim 1, wherein $R^3$ is selected from the group consisting of $CH_2$, $CH_2CH_2$, CO, O, NH, S, $SO_2$, $SO_2NH$, COO, CONH, and combinations thereof.

19. An inkjet ink comprising a liquid vehicle and at least one dye as in claim 1, wherein the dye is either soluble or dispersed in the inkjet ink.

20. A detection system, comprising:
a near infrared (NIR) illumination source;
an ink-jet ink of claim 19; and
a NIR sensor that detects absorption of the dye in the ink-jet ink illuminated by the NIR illumination source.

* * * * *

UNITED STATES PATENT AND TRADEMARK OFFICE
CERTIFICATE OF CORRECTION

PATENT NO. : 8,202,358 B2
APPLICATION NO. : 12/572490
DATED : June 19, 2012
INVENTOR(S) : Sivapackia Ganapathiappan et al.

It is certified that error appears in the above-identified patent and that said Letters Patent is hereby corrected as shown below:

In column 33, line 10, in Claim 1, delete "

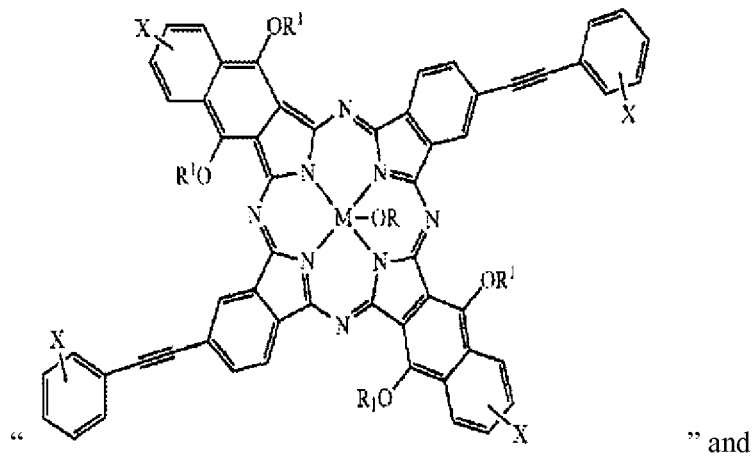

" and

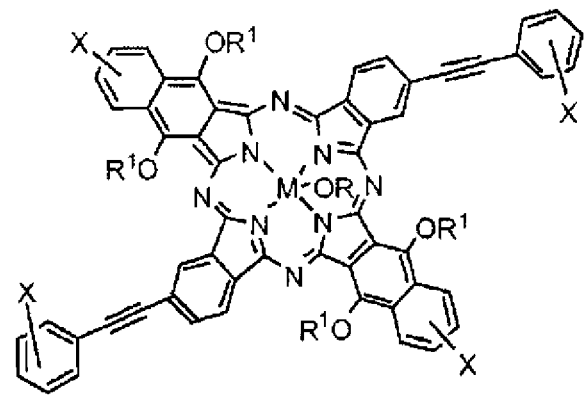

insert -- (XIII) --, therefor.

Signed and Sealed this
Twenty-sixth Day of March, 2013

Teresa Stanek Rea
*Acting Director of the United States Patent and Trademark Office*

CERTIFICATE OF CORRECTION (continued)
U.S. Pat. No. 8,202,358 B2

In column 35, line 8, in Claim 1, delete

"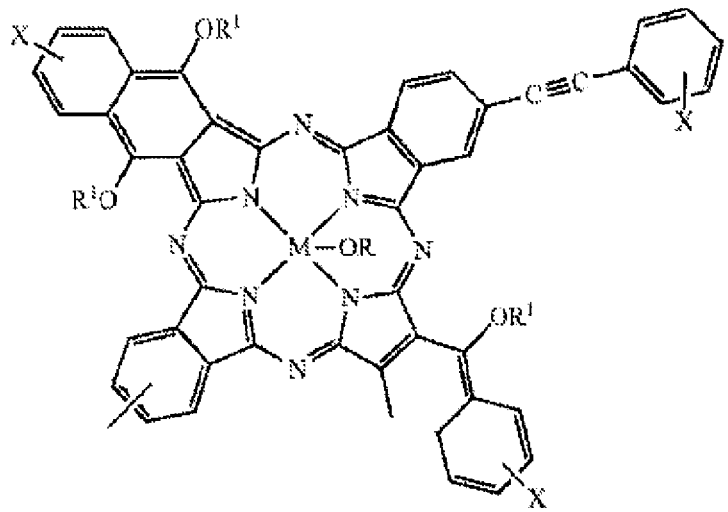" and insert --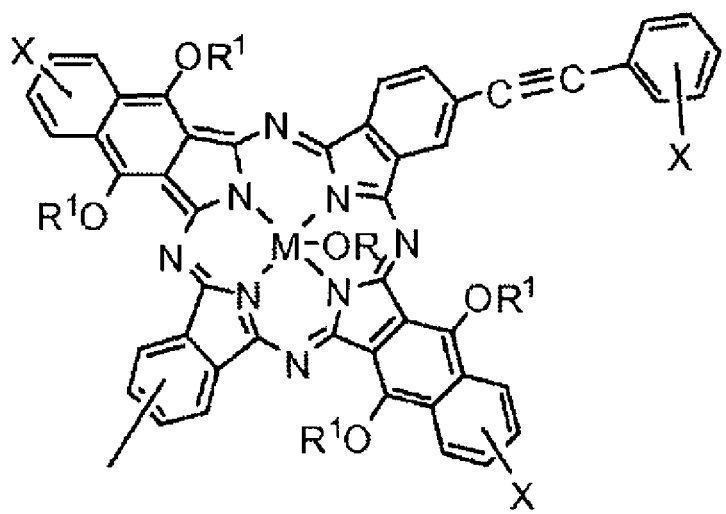--, therefor.

In column 35, line 18, in Claim 1, before "substituted" insert -- or --.

In column 37, line 49, in Claim 5, delete "of" and insert -- of: --, therefor.

CERTIFICATE OF CORRECTION (continued)
U.S. Pat. No. 8,202,358 B2

In columns 39-40, line 15, in Claim 5, delete

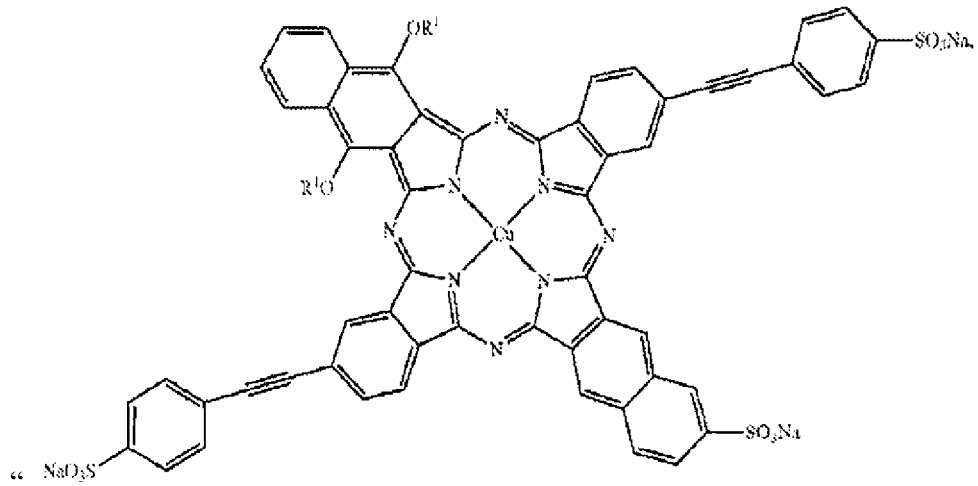

" and insert --

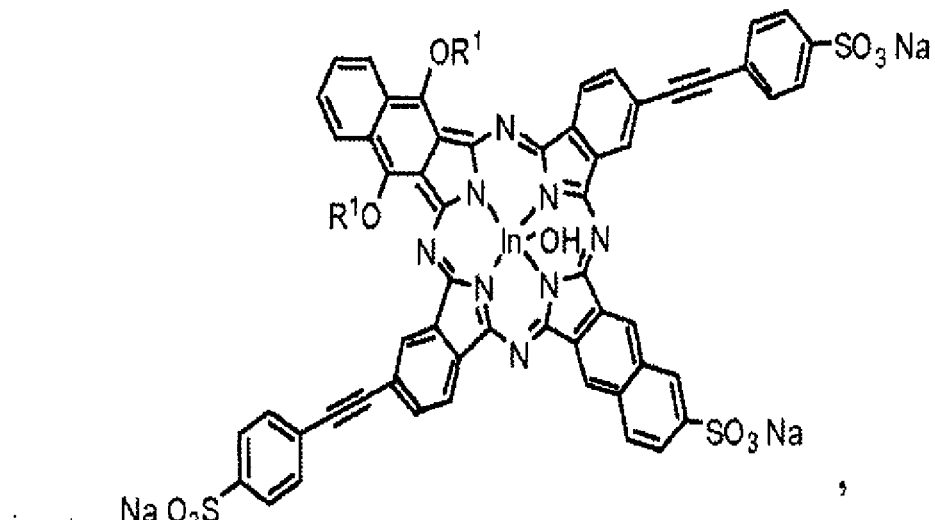

--, therefor.

In column 39, line 36, in Claim 7, delete "of" and insert -- of: --, therefor.